(12) United States Patent
Osaka

(10) Patent No.: US 9,489,714 B2
(45) Date of Patent: Nov. 8, 2016

(54) INFORMATION PROCESSING APPARATUS, INFORMATION PROCESSING SYSTEM, INFORMATION PROCESSING METHOD, AND PROGRAM

(71) Applicant: CANON KABUSHIKI KAISHA, Tokyo (JP)

(72) Inventor: Hitoshi Osaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/163,621

(22) Filed: Jan. 24, 2014

(65) Prior Publication Data

US 2014/0210863 A1  Jul. 31, 2014

(30) Foreign Application Priority Data

Jan. 28, 2013  (JP) .................................. 2013-013573

(51) Int. Cl.
*G09G 5/00* (2006.01)
*G06T 3/40* (2006.01)
*G06T 11/60* (2006.01)

(52) U.S. Cl.
CPC ........... *G06T 3/40* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,081,831 A * | 6/2000 | Miura ........................... | 709/206 |
| 6,326,957 B1 * | 12/2001 | Nathan ................. | G06F 3/0488 345/173 |
| 7,272,258 B2 * | 9/2007 | Berkner et al. ............... | 382/176 |
| 7,412,647 B2 * | 8/2008 | Sellers .................. | G06F 17/217 715/243 |
| 7,788,580 B1 * | 8/2010 | Goodwin et al. ............. | 715/243 |
| 2003/0014445 A1 * | 1/2003 | Formanek et al. ........... | 707/526 |
| 2004/0109020 A1 * | 6/2004 | Song .............................. | 345/744 |
| 2007/0124501 A1 * | 5/2007 | Lee et al. ....................... | 709/246 |
| 2011/0074709 A1 * | 3/2011 | Cheng et al. ................. | 345/173 |
| 2012/0096344 A1 * | 4/2012 | Ho et al. ........................ | 715/249 |
| 2012/0144292 A1 * | 6/2012 | Lee ................................ | 715/243 |
| 2012/0173960 A1 * | 7/2012 | Bennett .................. | G06F 17/217 715/234 |
| 2013/0002722 A1 * | 1/2013 | Krimon et al. ............... | 345/661 |
| 2013/0007603 A1 * | 1/2013 | Dougherty .............. | G06T 11/60 715/251 |
| 2013/0159823 A1 * | 6/2013 | Ri ........................... | G06F 17/00 715/204 |
| 2014/0006982 A1 * | 1/2014 | Wabyick et al. .............. | 715/763 |
| 2014/0365881 A1 * | 12/2014 | Suarez et al. ................. | 715/269 |
| 2014/0372949 A1 * | 12/2014 | Shaw et al. ................... | 715/830 |
| 2015/0058711 A1 * | 2/2015 | Zeng et al. .................... | 715/234 |

FOREIGN PATENT DOCUMENTS

JP  7-79288 A  3/1995

* cited by examiner

*Primary Examiner* — M Good Johnson
(74) *Attorney, Agent, or Firm* — Canon USA, Inc. I.P. Division

(57) ABSTRACT

An information processing apparatus includes an obtaining unit configured to obtain information regarding a size of a display screen of a display terminal that displays reflow format document data including a font with a set font size, a determining unit configured to determine whether the size of the display screen obtained from the information differs from a predetermined size, a setting unit configured to, if determined that the size of the display screen differs from the predetermined size, set the font size to a size determined based on the set font size, the size of the display screen, and the predetermined size, and if not determined that the size of the display screen differs from the predetermined size, keep the font size at the set font size, and a controlling unit configured to control the display screen to display the font at the font size set by the setting unit.

3 Claims, 23 Drawing Sheets

```
<html>
<body>
<h1>Section 1</h1> ~202
<p>Lorem ipsum dolor sit amet,
consectetur adipisicing elit, sed do
eiusmod tempor incididunt ut labore et ~203
dolore magna aliqua.</p>
<h1>Section 2</h1> ~204
<p>Ut enim ad minim veniam, quis nostrud
exercitation ullamco laboris nisi ut aliquip
ex ea commo dol consequat. Duis aute ~205
irure dolor in reprehenderit in voluptate
velit esse cillum dolore eu fugiat nulla
pariatur.</p>
<h1>Section 3</h1> ~206
<p>Excepteur sint occaecat cupidatat non
proident, sunt in culpa qui officia deserunt ~207
mollit anim id est laborum.</p>
</body>
</html>
```

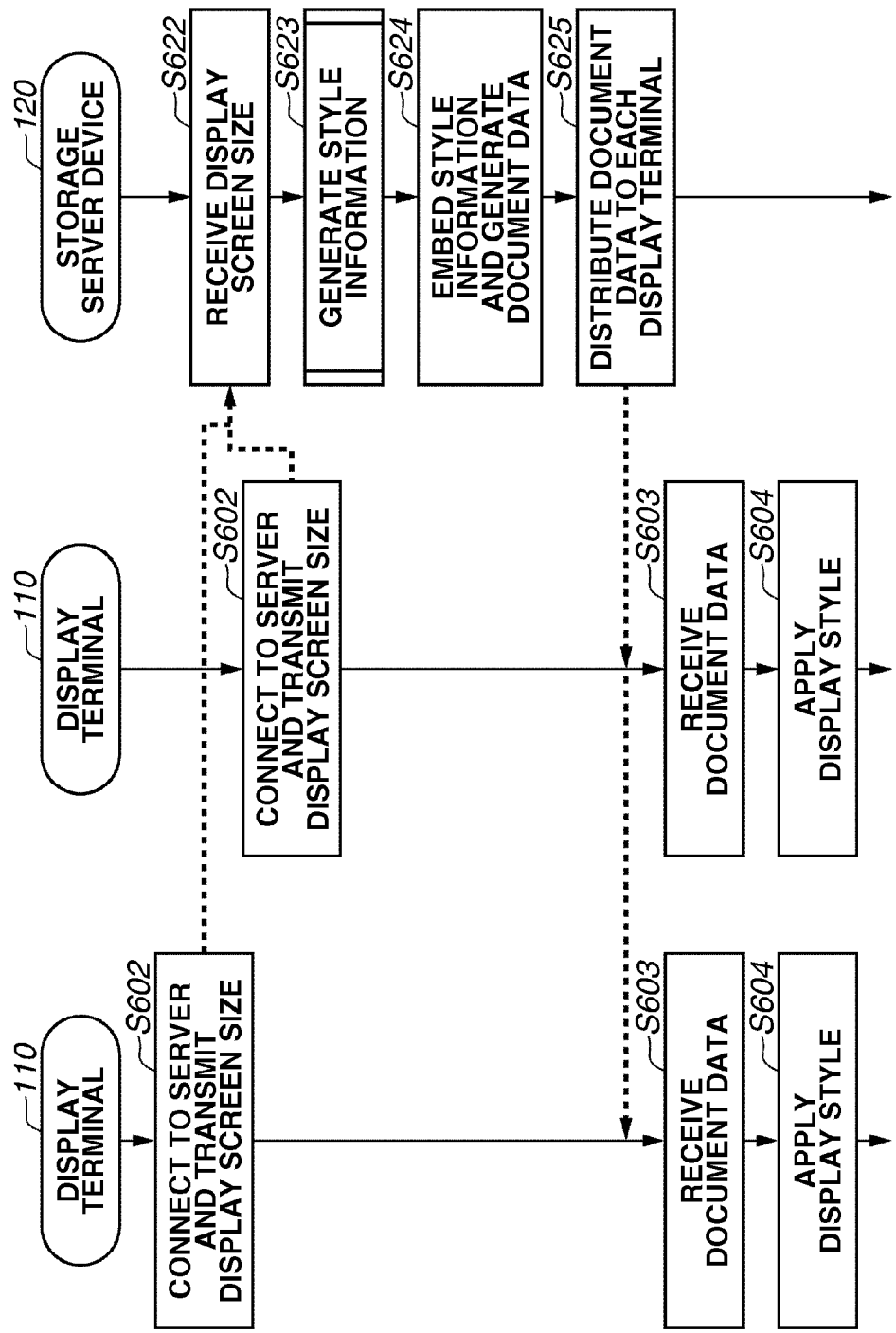

FIG.8

| INTEGER RATIO VALUE | 2 | 1 | 1/2 | 1/3 | 1/4 | 1/5 | 1/6 |
|---|---|---|---|---|---|---|---|
| (DECIMAL NUMBER) | 2 | 1 | 0.5 | 0.33 | 0.25 | 0.2 | 0.166 |

FIG.14A

```
Body {
    font-family: sans-serif;
    font-size: 11pt;
    line-height: 100%;
    letter-spacing: 0.1em;
}
```

FIG.14B

```
Body {
    font-family: sans-serif;
    font-size: 11pt;
    line-height: 40px;
    letter-spacing: 2px;
}
```

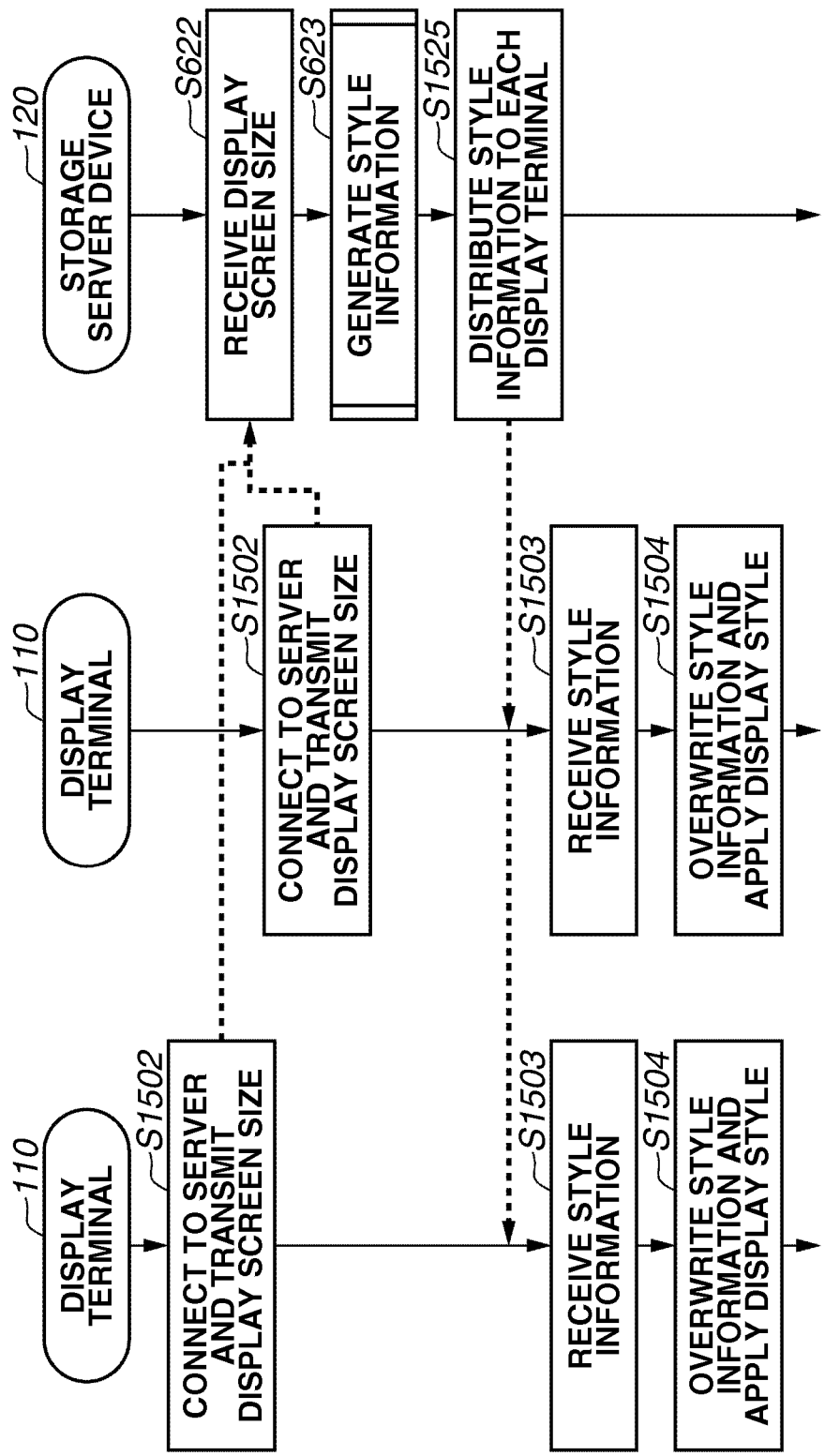

MAIN TERMINAL
(PAGE COUNT IS AT 121)

DIVISION REMAINDER IS 0 (ORIGINAL PAGE COUNT IS AT 242)

DIVISION REMAINDER IS 1 (ORIGINAL PAGE COUNT IS AT 243)

FIG.18

```
Body {
    font-family: sans-serif;
    font-size: 11pt;
    line-height: 40px;
    letter-spacing: 2px;
}
Nombre {
    page-ratio: 2;
}
```

1801 → Nombre {
1802 → page-ratio: 2;

INFORMATION PROCESSING APPARATUS, INFORMATION PROCESSING SYSTEM, INFORMATION PROCESSING METHOD, AND PROGRAM

BACKGROUND OF THE INVENTION

1. Field of the Invention

The present invention relates to an information processing apparatus, an information processing system, an information processing method, and a storage medium.

2. Description of the Related Art

In recently years, books, which have conventionally been published in the form of paper printed books, have also become available in the form of electronic books. Terminals for viewing electronic books have different display screens with different resolutions or sizes. Thus, an electronic book is often provided in a reflow format, which allows the layout of the electronic book to be changed according to the display screen size or the character size. Electronic Publication (EPUB) (registered trademark), which is a format defined by the International Digital Publishing Forum (IDPF), is an example of the format of a reflow format electronic book. EPUB is used as a standard format.

While a mobile terminal is also used as a viewing terminal, a mobile terminal has a display screen that is small relative to the size of paper. Thus, if a page of a typical document format is displayed in full page on a display screen having a small screen size, the characters become too small, and thus a user may not be able to recognize the displayed content. In such a case, the user needs to scroll the page or enlarge/reduce the display in order to recognize the content of the displayed page, leading to a problem that such operations are troublesome to the user.

The reflow format display through the EPUB format or the like described above can solve this problem. The reflow format does not have a fixed page format, and character typesetting can be changed according to the character size. Specifically, in the reflow format, as the character size increases, the number of characters that fit in a single page decreases, which in turn leads to an increase in the number of pages required to display the entire electronic book. In this manner, in the reflow format, character typesetting is changed according to the character size, and thus the reflow format provides a flexible display environment that is compatible with a wide variety of display screen sizes.

In addition, an electronic book is viewed by a plurality of users, and is shared among a plurality of terminals. As a system for sharing a document among a plurality of terminals, Japanese Patent Application Laid-Open No. 7-79288 discusses an electronic conference system for sharing a document among a plurality of terminals.

In this electronic conference system, a conference server transmits a document file to a conference terminal that has an application capable of displaying a document file format. Meanwhile, the conference server transmits image data, which is obtained by rasterizing the document into the images of a page format, to a conference terminal that does not have the application capable of displaying the document file format.

As described above, in the reflow format, a position where a page breaks depends on the character size and the display screen size. Thus, if the display screen size differs among the viewing terminals used by the users or if the character size set in the display screen differs among the terminals, the page break position varies among the terminals even when the same document is displayed. In other words, a document displayed in a reflow format does not include fixed page identification information. As the document does not include the page identification information as described above, there exists a problem that user convenience of the document decreases.

For example, when the same document is simultaneously viewed by a plurality of users at a conference in an office or during a class at a school, the users may need to share information located at the same position. With a typical book or printed document, the information located at the same position can be shared by a plurality of users when, for example, one of the users specifies the position with a page number (page identification information), which is a shared configuration, by saying "please look at the middle section on page 3."

However, the page break position is not fixed in the reflow format document data, and thus there exists a problem in that it is difficult to specify a position within document data by using the page identification information.

SUMMARY OF THE INVENTION

According to an aspect of the present invention, an information processing apparatus includes an obtaining unit configured to obtain information regarding a size of a display screen of a display terminal that displays reflow format document data, the document data including a font with a set font size, a determining unit configured to determine whether the size of the display screen obtained based on the obtained information differs from a predetermined size, a setting unit configured to, if the determining unit determines that the size of the display screen differs from the predetermined size, set the font size of the font included in the document data to be displayed on the display screen to a size determined based on the set font size, the size of the display screen, and the predetermined size, and if the determining unit does not determine that the size of the display screen differs from the predetermined size, keep the font size of the font included in the document data to be displayed on the display screen at the set font size, and a controlling unit configured to control the display screen to display the font included in the document data at the font size set by the setting unit.

Further features of the present invention will become apparent from the following description of exemplary embodiments with reference to the attached drawings.

BRIEF DESCRIPTION OF THE DRAWINGS

FIG. 4 illustrates an example of an electronic document.

FIG. 7 illustrates electronic document processing.

FIG. 8 illustrates an example of an integer ratio value table.

FIG. 14A illustrates an example of style information.

FIG. 14B illustrates another example of style information.

FIG. 16 illustrates electronic document processing according to a third exemplary embodiment of the present invention.

FIG. 18 illustrates an example of style information.

DESCRIPTION OF THE EMBODIMENTS

Various exemplary embodiments, features, and aspects of the invention will be described in detail below with reference to the drawings.

Figure 1:
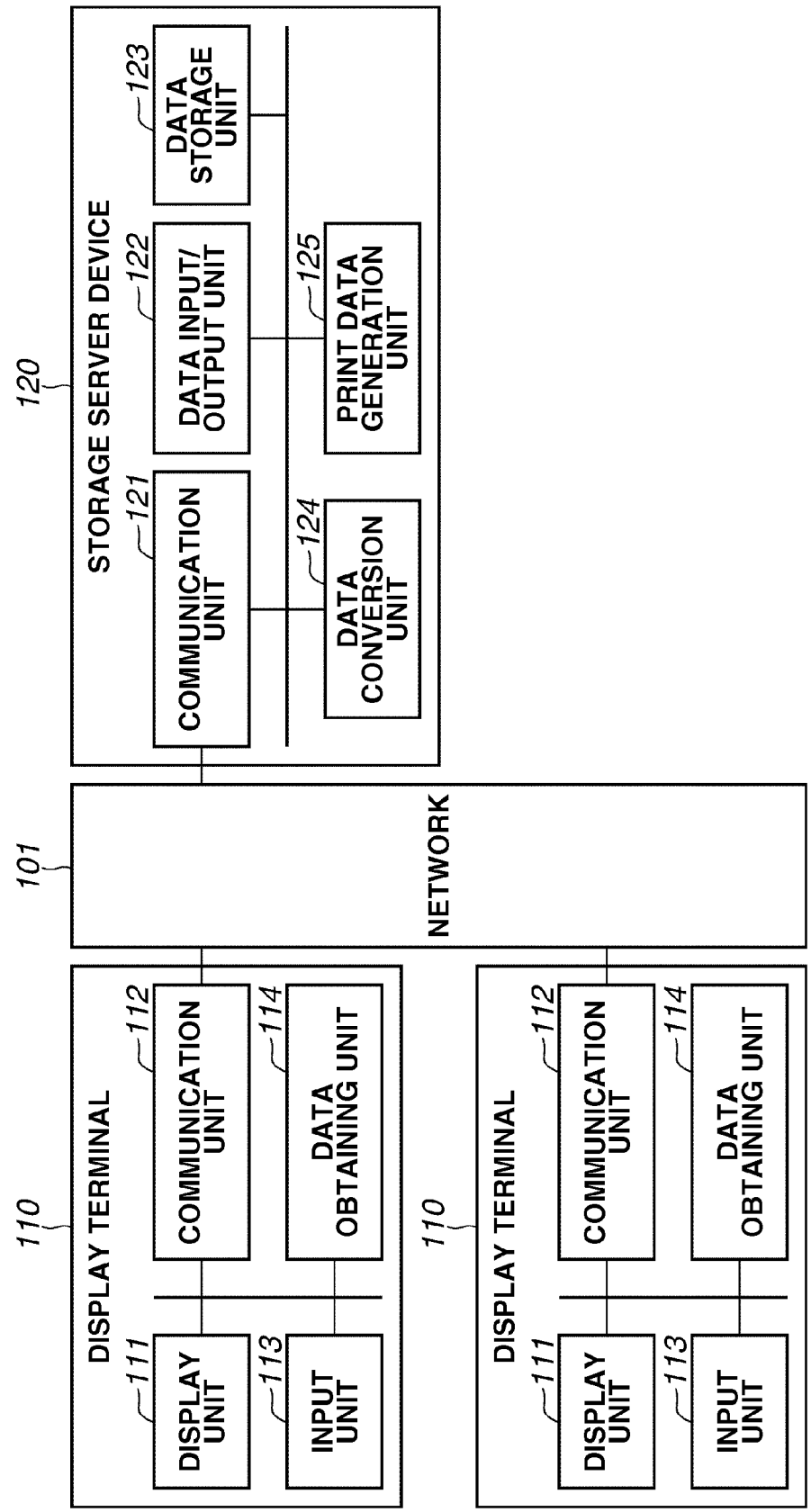
FIG. 1 illustrates an electronic document processing system.

FIG. 1 illustrates an overall configuration of an electronic document processing system serving as an information processing system according to a first exemplary embodiment of the present invention. The electronic document processing system includes a storage server device 120, which serves as an information processing apparatus, and a plurality of display terminals 110. Although FIG. 1 illustrates an exemplary configuration in which the electronic document processing system includes two display terminals 110, the exemplary embodiment does not limit the number of the display terminals 110 to be included in the electronic document processing system. The electronic document processing system may include three or more display terminals 110.

The storage server device 120 manages an electronic document such as an electronic book. The display terminal 110 is, for example, a mobile terminal. The display terminal 110 is provided with electronic document obtaining software. The electronic document obtaining software in the display terminal 110 transmits a request for obtaining an electronic document to the storage server device 120. In response to the request, the storage server device 120 carries out conversion processing on the electronic document and transmits the processed electronic document to the display terminal 110.

The display terminal 110 is connected to the storage server device 120 through a network 101. The network 101 may, for example, be the Internet, an intranet, or the like. The network 101 may also be constituted by a wide area network (WAN), a local area network (LAN), or the like.

Hereinafter, functional configurations of the display terminal 110 and of the storage server device 120 will be described. The display terminal 110 includes a display unit 111, a communication unit 112, an input unit 113, and a data obtaining unit 114. Each of the functions of the display terminal 110 is realized by a central processing unit (CPU) therein to be described below, which loads a program stored in a read only memory (ROM) or the like and executes the program.

The display unit 111 displays various pieces of data. The communication unit 112 carries out network communication. The input unit 113 receives a data input or an instruction operation by a user. The data obtaining unit 114 obtains an electronic document.

The storage server device 120 includes a communication unit 121, a data input/output unit 122, a data storage unit 123, a data conversion unit 124, and a print data generation unit 125. Each of the functions of the storage server device 120 is realized by a CPU therein to be described below, which loads a program stored in a ROM or the like and executes the program.

The communication unit 121 connects to the network 101 and carries out network communication with other devices. The data input/output unit 122 receives an electronic document from an external device or outputs an electronic document to an external device. The data storage unit 123 stores an electronic document, print data, and so on. The data conversion unit 124 carries out conversion processing on an electronic document. The print data generation unit 125 generates print data.

Figure 2:
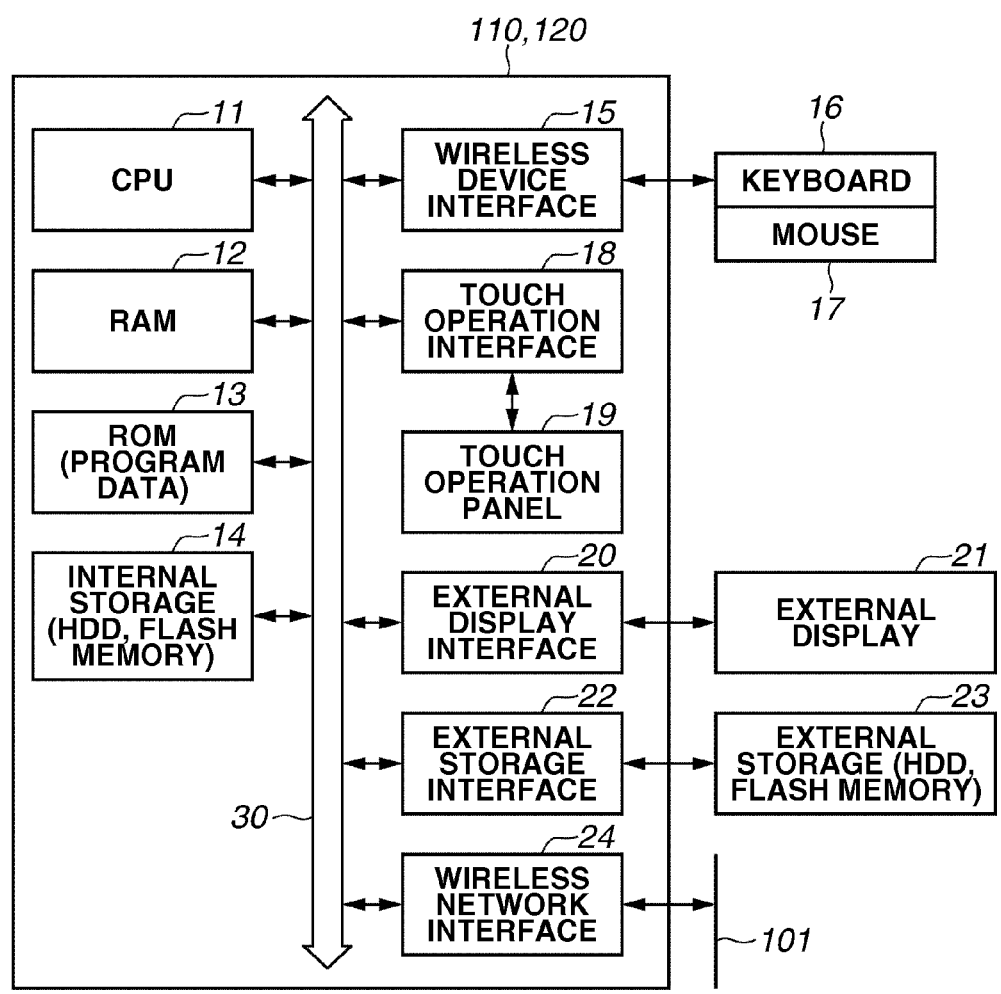
FIG. 2 illustrates a display terminal.

FIG. 2 illustrates a hardware configuration of the display terminal 110. The display terminal 110 includes a CPU 11, a random access memory (RAM) 12, a ROM 13, an internal storage 14, and a wireless device interface 15. The display terminal 110 further includes a touch operation interface 18, a touch operation panel 19, an external display interface 20, an external storage interface 22, and a wireless network interface 24. These hardware pieces are connected to a system bus 30.

The CPU 11 controls the display terminal 110. The RAM 12 serves as a work memory for the CPU 11 to operate. The ROM 13 stores a program and data to be used for processing. The internal storage 14 stores a program and data and also provides a storage area to be used for reading and writing data or the like. The internal storage 14 may, for example, be a hard disk drive (HDD) or a flash memory.

The wireless device interface 15 communicates with a keyboard 16 and a mouse 17, which are external input devices, by using a wireless technology such as Bluetooth®. The touch operation panel 19 is a display panel for displaying information. The touch operation panel 19 also serves as an input unit such as a capacitive touch panel that can receive a touch operation of the user. The touch operation interface 18 displays information on the touch operation panel 19. The touch operation interface 18 also receives information input through the touch operation panel 19. The external display interface 20 displays information on an external display 21.

The external storage interface 22 transmits and receives data to and from an external storage 23 that is not included in the display terminal 110 serving as a computer. The wireless network interface 24 transmits and receives signals to and from the network 101.

The hardware configuration of the storage server device 120 is similar to the hardware configuration of the display terminal 110 illustrated in FIG. 2. The storage server device 120, however, may not include the touch operation interface 18 or the touch operation panel 19.

Processing by the display terminal 110 to be described below with reference to FIG. 7 and so on is realized by the CPU 11 of the display terminal 110, which loads a program stored in the ROM 13 or the like and executes the program. In addition, processing by the storage server device 120 to be described below with reference to FIG. 7 and so on is realized by the CPU 11 of the storage server device 120, which loads a program stored in the ROM 13 or the like and executes the program.

Figure 3:
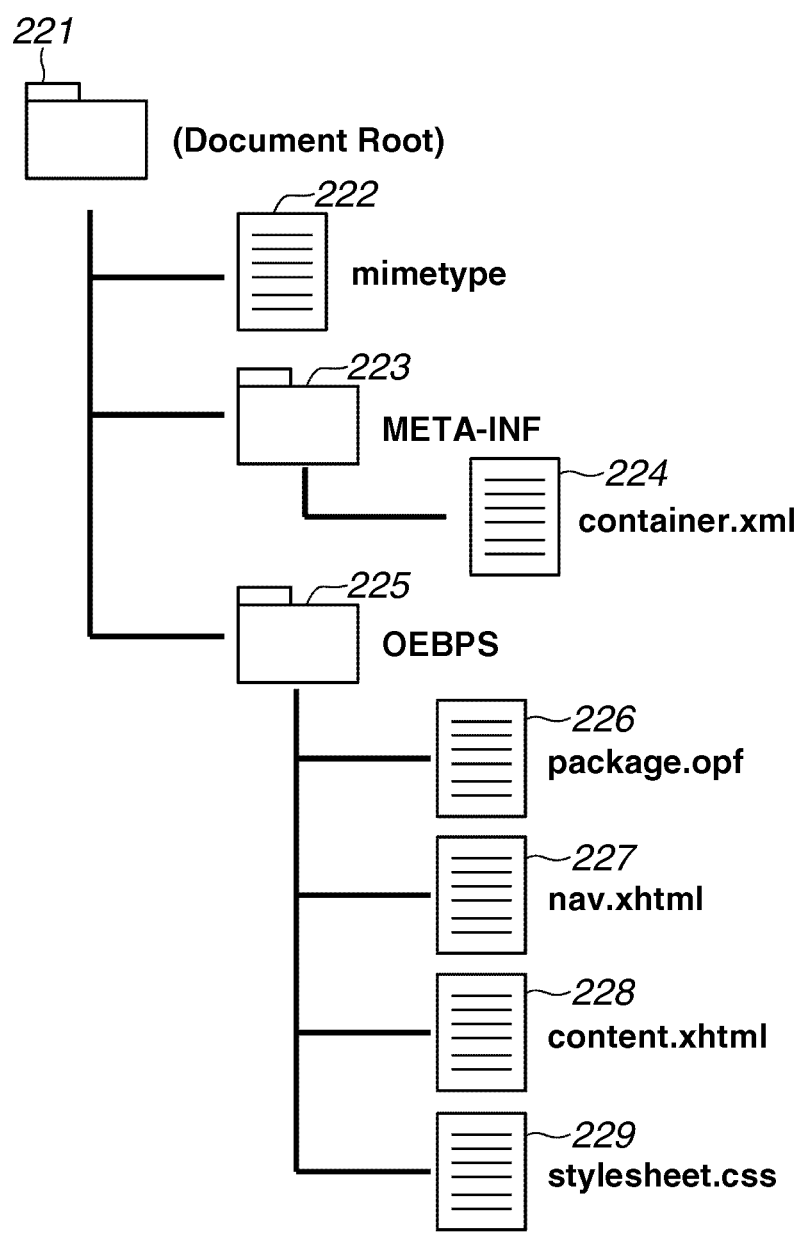
FIG. 3 illustrates an example of document data.

FIG. 3 illustrates an example of document data to be processed in the electronic document processing system. FIG. 3 schematically illustrates the structure of reflow format EPUB document data. Under a document root 221, the document data contains a mimetype 222, a META-INF folder 223, and an Open eBook Publication Structure (OEBPS) folder 225. The text encoding is specified in the mimetype 222. The META-INF folder 223 stores a container.xml 224 that indicates the location of content. The OEBPS folder 225 stores document content serving as an electronic document. The OEBPS folder 225 contains a package.opf 226, a nay.xhtml 227, a content.xhtml 228, and a stylesheet.css 229. The package.opf 226 indicates information on the structure of the document content. The nay.xhtml 227 indicates information on the table of contents of the document content. The content.xhtml 228 contains the document content itself, i.e., information that indicates the content of the electronic document. The stylesheet.css 229 indicates style information (style sheet) for displaying the document content. Note that the file names of the package.opf 226 and the content.xhtml 228 may be set as desired.

FIG. 4 illustrates an example of the document content indicated in the content.xhtml 228 illustrated in FIG. 3. The document content illustrated in FIG. 4 is an Extensible HyperText Markup Language (XHTML) document. The XHTML document indicated in the content.xhtml 228 contains information on the document content section of the electronic document, or in other words, information that indicates the content of the electronic document. In an XHTML document 201 illustrated in FIG. 4, section titles 202, 204, and 206 are marked with <h1> and </h1> tags. Body texts 203, 205, and 207 are marked with <p> and </p> tags.

In the first exemplary embodiment, an example will be described where an EPUB format electronic document is a target to be processed by the electronic document processing system. However, the format of an electronic document to be processed by the electronic document processing system is not limited thereto. The electronic document processing system can process any reflow format electronic documents, such as an HTML format or Word format electronic document, in which page identification information is not fixed. Such formats are not limited to those described in the exemplary embodiments.

Figure 5:
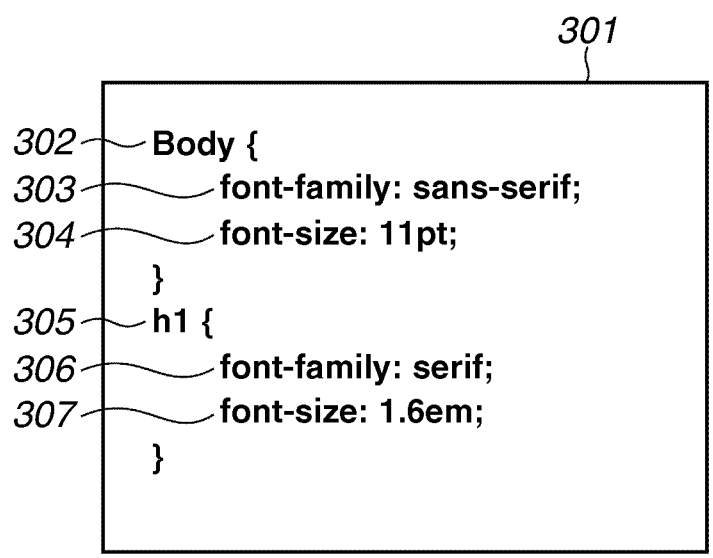
FIG. 5 illustrates an example of style information.

FIG. 5 illustrates an example of style information (Cascading Style Sheets (CSS)) indicated in the stylesheet.css 229 illustrated in FIG. 3. CSS defines how an XHTML document is displayed. The defined style is interpreted by a display system of XHTML, or in other words, by an EPUB viewer and is used for rasterizing the electronic document into a display image to be used when the electronic document is displayed on the display screen by the EPUB viewer.

A CSS file 301 includes a "Body" 302. The display style of the body texts 203, 205, and 207 written in the XHTML document 201 illustrated in FIG. 4 is defined in the "Body" 302. The font type is indicated in a "font-family" 303. The font size is indicated in a "font-size" 304. Here, "font-size: 11 pt" indicates that the target (body text) is displayed in the EPUB viewer at a font size (fixed value) of 11 pt.

The display style of the section titles 202, 204, and 206 written in the XHTML document 201 illustrated in FIG. 4 is defined in a "h1" 305. The font type is indicated in a "font-family" 306, as in the "font-family" 303. The font size is indicated in a "font-size" 307, as in the "font-size" 304. Here, "font-size: 1.6em" indicates that a target item (section title in this example) is displayed in the EPUB viewer at a font size that is 1.6 times higher than the height of the letter "M" of a predefined font size. Although various other styles can be defined by using CSS, descriptions thereof will be omitted herein.

The storage server device 120 according to the first exemplary embodiment generates style information to be applied to an electronic document, prior to providing the electronic document to the display terminals 110. The storage server device 120 then provides the style information along with the electronic document to the display terminals 110. The storage server device 120 generates a plurality of pieces of style information to be provided to the respective display terminals 110 so that the pagination matches when the electronic document is displayed on a plurality of display screens having different display screen sizes.

Here, a state in which the pagination matches refers to a state in which a position where each page breaks on a display screen of one display terminal 110 matches a position where a page breaks every multiple pages on a display screen of another display terminal 110. For example, the pagination is considered to match if a position where each page breaks on a display screen of one display terminal 110 matches a position where a page breaks every two pages on a display screen of another display terminal 110. The position where a page breaks refers to a boundary position between pages. Hereinafter, a segment of an electronic document that is defined by page break positions is referred to as a unit of display or a unit of page. In addition, processing for determining a position where a page breaks is referred to as "pagination".

In the CSS style information applied to an electronic document to be processed by the electronic document processing system according to the first exemplary embodiment, when a display font size is defined as a fixed value, the pagination is fixed. Thus, the storage server device 120 according to the first exemplary embodiment uses a fixed value to define the display font size in the style information.

In addition, when the display screen size of the display terminal 110 is small, the storage server device 120 according to the first exemplary embodiment, instead of reducing the display font size, performs pagination in a smaller unit, which will be described below in further detail. This can avoid a situation in which the user has difficulty in discriminating characters due to the display font size being reduced.

Figure 6A:
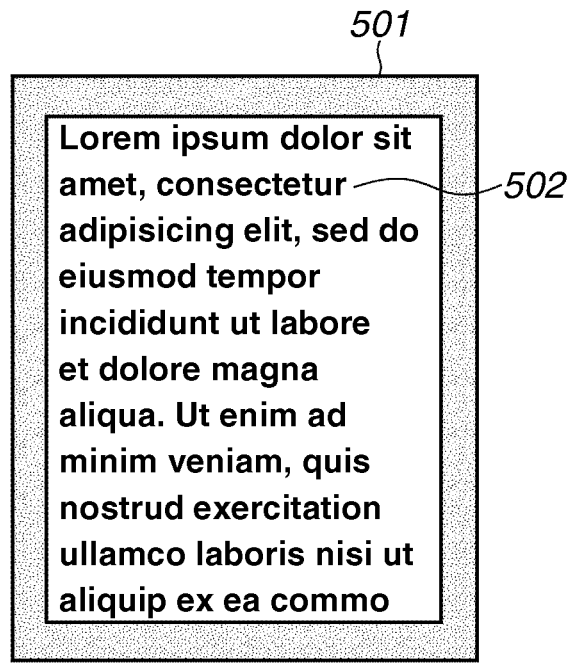
FIG. 6A illustrates a display example of an electronic document.
Figure 6B:
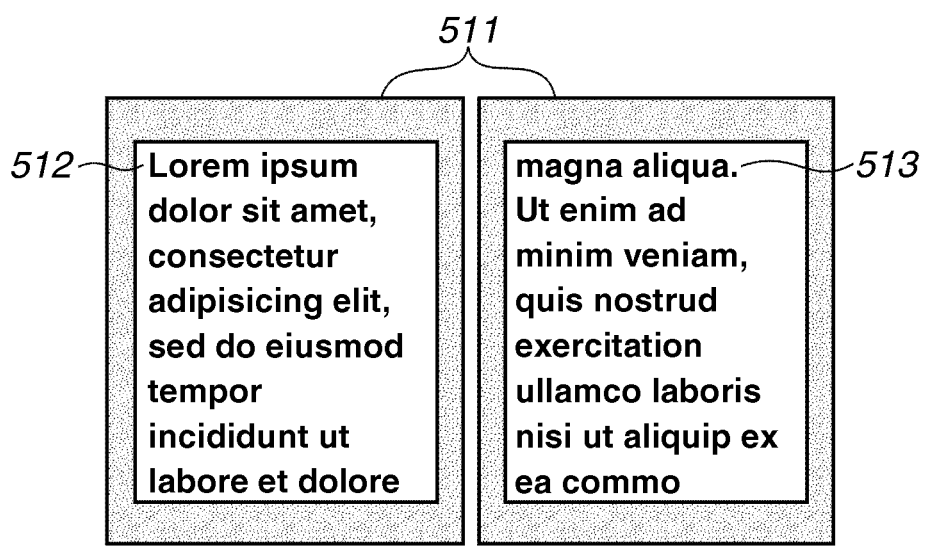
FIG. 6B illustrates another display example of the electronic document.

FIGS. 6A and 6B illustrate examples of an electronic document displayed on display screens having different display screen sizes based on the style information generated by the storage server device 120 according to the first exemplary embodiment. FIG. 6A illustrates a display screen 501 and a page 502 of the electronic document displayed on the display screen 501. FIG. 6B illustrates a display screen 511 and a page 512 and a page 513 of the electronic document, each displayed on the display screen 511. Note that the display screen 511 illustrated in FIG. 6B has a smaller display screen size than the display screen 501 illustrated in FIG. 6A.

As illustrated in FIG. 6A, the "Lorem to common" portion of the electronic document is displayed on the display screen 501 as the page 502. Meanwhile, as illustrated in FIG. 6B, the content of the page 502 displayed on the display screen 501 is displayed across the two pages 512 and 513 when the electronic document is displayed on the display screen 511. To be more specific, the "Lorem to dolore" portion of the electronic document is displayed in the page 512 on the display screen 511. The portion of the electronic document after "dolore" is then displayed in the page 513 through a page advancing operation by the user.

In addition, the end position of the page 513 on the display screen 511 matches the end position of the page 502 on the display screen 501. In this manner, the storage server device 120 can generate such style information that allows the content of one page on the display screen of one display terminal 110 to fit in the number of pages that is an integral multiple of one page on the display screen of another display terminal 110.

Note that the user can view the entire electronic document by advancing a page through a publicly known method such as tapping the screen. Although the display screens illustrated in FIGS. 6A and 6B are elongated vertically, the shape of the display screen is not limited thereto. For example, the display screen of the display terminal 110 may be elongated horizontally.

FIG. 7 is a sequence diagram illustrating the electronic document processing by the electronic document processing system. In the description of the electronic document processing, processing of only a single display terminal 110 will be described. In reality, however, all of a plurality of display terminals 110 included in the electronic document processing system carries out processing similar to the processing of the display terminal 110 described hereinafter.

Prior to the sequence processing, the display terminal 110 obtains device information regarding its own screen information, i.e., the display screen size through an application program interface (API). Here, the display screen size refers to the size of the display screen included in the display terminal 110, in other words, the size of the external display 21 illustrated in FIG. 2. To be more specific, the display screen size refers to the area of the display screen.

The display screen size may not be the size of the external display 21. For example, if the size of a document display area that the EPUB viewer in the display terminal 110 can obtain internally is identifiable, this size can be obtained as the display screen size. Here, the document display area refers to a content area within the page displayed by the viewer.

In the electronic document processing, in step S602, the display terminal 110 first connects to the storage server device 120. The display terminal 110 connects to the storage server device 120 through, for example, processing of a web browser included in the display terminal 110 or of a connection application included in the display terminal 110.

When connected to the display terminal 110, the storage server device 120 requests the display terminal 110 to input a user ID, a password, and so on, as necessary. Through this connection, the display terminal 110 transmits the display screen size of the display screen for displaying an electronic document to the storage server device 120.

The storage server device 120 in turn receives the display screen size from the display terminal 110 (receiving processing). In step S622, when a given amount of time elapses after the first login starts, the storage server device 120 notifies the display terminal 110 of closing the login and then closes the connection with the display terminal 110. The storage server device 120 stores all of the display screen sizes received in step S622 into the data storage unit 123.

In step S623, the storage server device 120 generates style information based on the respective display screen sizes of the plurality of display terminals 110 stored in the data storage unit 123. To be more specific, the storage server device 120 generates such style information that allows the pagination to match among the display terminals 110 when the electronic document is displayed on the display screens of the respective display terminals 110. In step S623, each of the display terminals 110 of which the display screen size has been received serves as a target display terminal 110, and the storage server device 120 generates a plurality of pieces of style information that are suitable for the respective target display terminals 110. This style information generation processing in step S623 will be described below with reference to FIG. 9.

In step S624, the storage server device 120 embeds the style information generated in step S623 into the EPUB document data to be distributed to each of the target display terminals 110. In step S625, the storage server device 120 distributes, to each of the target display terminals 110, the document data that contains the style information for each of the target display terminals 110 and the electronic document.

Meanwhile, in step S603, each of the display terminals 110 receives the distributed document data. To be more specific, the display terminal 110 receives the document data through the web browser or the connection application through which the terminal device 110 has connected to the storage server device 120.

Thereafter, each of the display terminals 110 opens the document data in the EPUB viewer. In step S604, the EPUB viewer reads the style information embedded in the document data and applies the display style to the electronic document. In other words, the EPUB viewer paginates the electronic document according to the style information to generate an electronic document in units of page (units of display), i.e., generate display information. The EPUB viewer then displays the display information on the display screen of the display terminal 110. The processing in step S604 is an example of display information generation processing and display control processing.

As another example of the electronic document processing, the storage server device 120 may paginate an electronic document (perform display information generation processing) based on style information that has been generated for a target display terminal 110. In this case, the storage server device 120 transmits the generated display information to the corresponding target display terminal 110. The display terminal 110 that has received the display information then displays the received display information.

As yet another example, in step S602, the display terminal 110 may transmit, in place of the display screen size, a terminal ID for identifying the display terminal 110. The assumption in this case is that the storage server device 120 stores device information of each of the display terminals 110, which is associated with its terminal ID. If the storage server device 120 receives a terminal ID, the storage server device 120 may then refer to the device information associated with the received terminal ID and identify the display screen size of the corresponding display terminal 110.

The style information generation processing (step S623) will now be described. As illustrated in FIGS. 6A and 6B, in the style information generation processing, the storage server device 120 determines such a display font size in each of the display terminals 110 that achieves units of display in which the pagination of the displayed electronic document matches among the display screens having different display screen sizes.

To be more specific, the storage server device 120 determines a main terminal among the plurality of display terminals 110. The storage server device 120 then determines a unit of display (unit of page) of the main terminal based on the display screen size of the main terminal and uses the unit of display of the main terminal as a reference unit for dividing the electronic document.

In other words, the storage server device 120 determines, based on the reference unit, a unit of page on the display screen of a given terminal having a different screen size from the reference screen size so that the pagination matches between the display screens of the given terminal and the main terminal. The pagination is made to match by the storage server device 120 by using an integer ratio value table illustrated in FIG. 8 in the style information generation processing.

The integer ratio value table, which defines integer ratio values, is stored in advance in the data storage unit 123. Here, an integer ratio value is a ratio value of a unit of display on a display screen of each of the display terminals 110 to the reference unit. In the first exemplary embodiment, the integer ratio values include values that are each an integral multiple of "1" serving as the reference value and values that are each an integral submultiple of "1".

In the style information generation processing, the storage server device 120 assigns any one of the integer ratio values in the integer ratio value table to each of the display terminals 110. The storage server device 120 then determines a unit of page in each of the display terminals 110, or in other words, a position where a page breaks in each of the display terminals 110 based on the assigned integer ratio value.

For example, in a display terminal 110 to which "integer ratio value=2" is assigned, the content of two pages in the main terminal is displayed on a single display screen of the display terminal 110. In a display terminal 110 to which "integer ratio value=½" is assigned, the content of half a page in the main terminal is displayed on a single display screen of the display terminal 110. In other words, the content of a single page in the main terminal is displayed across two pages in the display terminal 110 to which "integer ratio value=½" is assigned. In a display terminal 110 to which "integer ratio value=⅓" is assigned, the content of a third page in the main terminal is displayed on a single display screen of the display terminal 110. In other words, the content of a single page in the main terminal is displayed across three pages in the display terminal 110 to which "integer ratio value=⅓" is assigned.

In this manner, if a given display terminal 110 has a screen size larger than the display screen size of the main terminal, the storage server device 120, in which the content of a single page in the main terminal is defined as the reference unit, determines the pagination such that a unit of page in the given display terminal 110 is an integral multiple of the reference unit. Meanwhile, if a given display terminal 110 has a screen size smaller than the display screen size of the main terminal, the storage server device 120 determines the pagination such that a unit of page in the given display terminal 110 is an integral submultiple of the reference unit. In either case, the pagination matches between the main terminal and the given display terminal 110.

Figure 9:
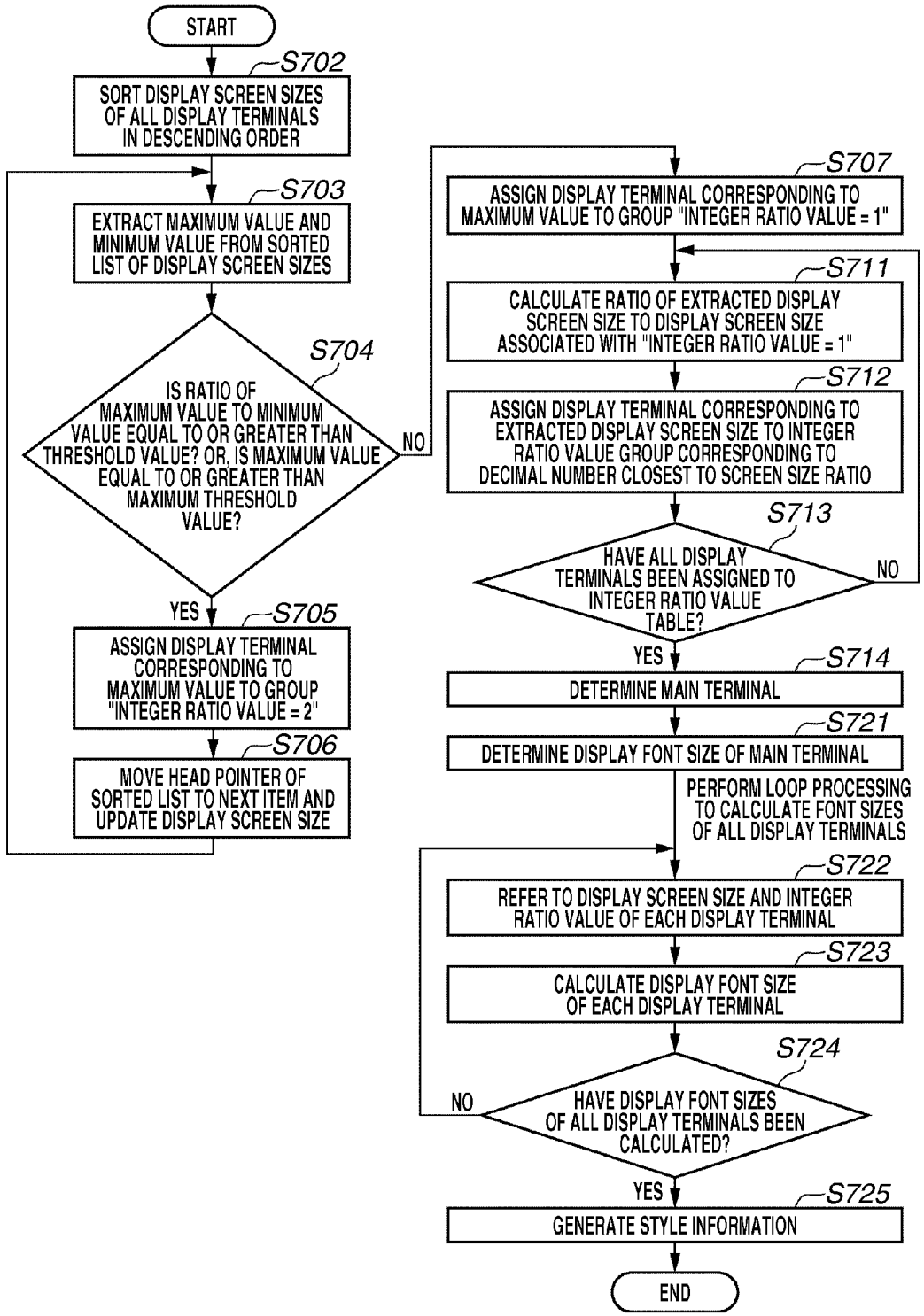
FIG. 9 is a flowchart illustrating style information generation processing.

FIG. 9 is a flowchart illustrating the style information generation processing (step S623) in detail. The storage server device 120 determines the main terminal through processes in steps S702 to S714 of the style information generation processing. The storage server device 120 calculates the display font size in each of the display terminals 110 through the subsequent processes in steps S721 to S724.

In step S702, the storage server device 120 sorts, in descending order, the plurality of display screen sizes that have been received in step S622 of FIG. 7 and that are stored in the data storage unit 123.

In step S703, the storage server device 120 extracts a maximum value and a minimum value from the sorted list of display screen sizes. To be more specific, the storage server device 120 obtains the top and bottom items on the sorted list as the maximum value and the minimum value, respectively.

The storage server device 120 then obtains a ratio of the maximum value to the minimum value and compares the obtained ratio with a ratio threshold value. Here, the ratio threshold value is, for example, 10:1. In step S704, the storage server device 120 also compares the maximum value with a maximum threshold value. Here, the maximum threshold value is, for example, an area of 300 cm$^2$. Note that the ratio threshold value and the maximum threshold value are preset in the storage server device 120.

In step S704, if the ratio is equal to or greater than the ratio threshold value or if the maximum value is equal to or greater than the maximum threshold value (Yes in step S704), the storage server device 120 proceeds to processing in step S705. Specifically, in step S705, the storage server device 120 assigns a display terminal 110 that corresponds to the maximum value to a group of "integer ratio value=2" in the integer ratio value table. In step S706, the storage server device 120 moves the head pointer of the sorted list to the next item on the sorted list and updates the display screen size corresponding to the top item on the sorted list. The storage server device 120 then repeats the processes in steps S703 and S704.

In step S704, if the display screen size ratio is less than the ratio threshold value and if the maximum value is less than the maximum threshold value (No in step S704), the storage server device 120 proceeds to processing in step S707. Specifically, in step S707, the storage server device 120 assigns a display terminal 110 that corresponds to the maximum value to a group of "integer ratio value=1" in the integer ratio value table.

Thereafter, the storage server device 120 calculates screen size ratios of all of the display screen sizes on the sorted list through loop processing in steps S711 to S713. Here, the screen size ratio refers to a ratio of a target display screen size to a display screen size associated with the group of "integer ratio value=1" in step S707.

To be more specific, the storage server device 120 extracts one display screen size from the sorted list. In step S711, the storage server device 120 calculates a ratio of the extracted display screen size to the display screen size associated with "integer ratio value=1", or in other words, calculates the screen size ratio.

For example, if a display screen size of an area of 90 cm$^2$ is assigned to "integer ratio value=1" in step S707, the screen size ratio of a target display screen size having an area of 60 cm$^2$ turns out to be "60/90=0.666 . . . ".

The storage server device 120 then compares the screen size ratio calculated in step S711 with decimal numbers in the integer ratio value table (FIG. 8). In step S712, the storage server device 120 assigns a display terminal 110 that corresponds to the extracted display screen size to an integer ratio value group that corresponds to one of the decimal numbers that is closest to the screen size ratio.

For example, the value of "0.666 . . . " is closest to "0.5" among the decimal numbers in the integer ratio value table.

Therefore, the display terminal 110 for which the value of "0.666 . . . " has been obtained is associated with a group of "integer ratio value=0.5". Through the processing described above, the storage server device 120 assigns each of the display terminals 110 to a corresponding one of the integer ratio values and stores the obtained information.

The storage server device 120 repeats the processes in steps S711 and S712, and in step S713, the storage server device 120 assigns each of the display terminals 110 to a correspond one of the integer ratio values in the integer ratio value table. Here, the integer ratio values to which the display terminals 110 have been assigned are each used to determine the pagination, i.e., the unit of display.

Subsequently, the storage server device 120 identifies, among the display terminals 110 assigned to "integer ratio value=1", a display terminal 110 having the smallest display screen size. In step S714, the storage server device 120 determines the identified display terminal 110 that corresponds to the smallest display screen size as the "main terminal".

In the first exemplary embodiment, the storage server device 120 sets, among the display terminals 110 assigned to "integer ratio value=1", a display terminal 110 that corresponds to the smallest display screen size as the main terminal. This processing allows, even in the smallest one of the display screens of the display terminals 110 assigned to "integer ratio value=1", the display font size to be set to a character size at which the user can easily recognize the characters.

The method for determining the main terminal, however, is not limited to the above. As another example, the storage server device 120 may set, among the display terminals 110 assigned to "integer ratio value=1", a display terminal 110 having a display screen size of a median value or a maximum value as the main terminal. In other words, the storage server device 120 can flexibly determine a method for determining the main terminal by using the display screen size or the like of the target display terminal 110.

In step S721, the storage server device 120 determines the display font size of the main terminal. To be more specific, the storage server device 120 determines the display font size of the main terminal to be a reference character size, which is preset to, for example, 11 pt. As another example, the display font size of the main terminal may be set by the user according to the usage environment.

The main terminal is determined through the processing in step S714, and the display font size of the main terminal is determined through the processing in step S721. Here, the unit of display of the main terminal, or in other words, the reference unit is a value determined by determining the display font size of the main terminal. In other words, the processing in step S714 and the processing in step S721 are collectively an example of reference unit determination processing.

Thereafter, the storage server device 120 calculates the display font size of each of the display terminals 110 through loop processing in steps S722 to S724. Specifically, in step S722, the storage server device 120 refers to the display screen sizes of the respective display terminals 110 and to the integer ratio values to which the respective display terminals 110 are assigned. In step S723, the storage server device 120 calculates the display font sizes of the respective display terminals 110 except for that of the main terminal through Expression (1). Note that Expression (1) is used to determine a font size for achieving the integer ratio values assigned to the respective display terminals 110.

$$FontT = FontS \times \sqrt{\frac{AreaT}{AreaS \times \text{Ratio}}}$$

FontS: reference font size of main terminal

FontT: font size of calculation target terminal

AreaS: screen size (area) of standard terminal

AreaT: screen size (area) of calculation target terminal

Ratio: previously obtained integer ratio value

Here, FontS represents the display font size of the main terminal. FontT represents the display font size of a display terminal 110 of which the display font size is to be calculated. AreaS represents the screen size (area) of the main terminal. AreaT represents the display screen size (area) of the display terminal 110 of which the display font size is to be calculated. Ratio represents an integer ratio value to which the display terminal 110 of which the display font size is to be calculated is assigned.

In this manner, the storage server device 120 determines the display font size of the target display terminal 110 with respect to the display font size of the main terminal, based on the ratio of the display screen size of the target display terminal 110 to that of the main terminal and on the integer ratio value by using Expression (1).

The storage server device 120 repeats the processes in steps S722 and S723, and in step S724, the storage server device 120 calculates the display font sizes of all of the display terminals 110. Note that the integer ratio values of the respective display terminals 110 except for that of the main terminal are determined in step S713, and the display font sizes of the respective display terminals 110 except for that of the main terminal are determined in step S723. Here, the unit of display of the display terminal 110 is a value determined by determining the display font size thereof. In other words, the processing in step S713 and the processing in step S723 are collectively an example of unit-of-display determination processing in which the display terminals 110 except for the main terminal serve as the target display terminals 110 and the unit of displays are determined based on the display screen sizes of the respective target display terminals 110.

In step S725, the storage server device 120 generates style information that indicates the display font sizes obtained for the respective display terminals 110. To be more specific, the storage server device 120 writes the display font size obtained through the processing described above in the "font-size" 304 under the "Body" 302 of the style information illustrated in FIG. 5. Thus, the style information generation processing is completed.

Note that the processing in step S625 of the electronic document processing (FIG. 7) serves to transmit the style information that contains unit information indicating the unit of display and is an example of transmission processing.

Now, with reference to FIG. 10, the style information generation processing will be described in further detail. Here, a case will be described where the storage server device 120 has received the display screen sizes of devices A to E, which serve as the display terminals 110, illustrated in FIG. 10. Here, the maximum threshold value is, for example, an area of 300 cm$^2$.

In this case, the display screen size of the device A is greater than the maximum threshold value. Therefore, in step S705, the device A is assigned to the group of "integer ratio value=2". Meanwhile, in step S707, the device B is assigned to the group of "integer ratio value=1".

Thereafter, through the loop processing on the display screen sizes of all of the display terminals 110 in steps S711 to S713, in step S711, the storage server device 120 calculates the ratio of the display screen size of each of the other display terminals 110 to the display screen size of the device B, or in other words, calculates the screen size ratio. In step S712, the storage server device 120 maps the results of the calculation of the screen size ratio to the integer ratio value table.

In step S714, the storage server device 120 determines, among the display terminals 110 assigned to "integer ratio value=1", a display terminal 110 of which the display screen size is the smallest as the main terminal. In the example illustrated in FIG. 10, two display terminals 110, namely the device C and the device C, are assigned to "integer ratio value=1". Of these two, the device C has a smaller display screen size. Therefore, the storage server device 120 determines the device C as the main terminal.

In step S712, the device B is assigned to "integer ratio value=1". The device A is assigned to "integer ratio value=2". The device D is assigned to "integer ratio value=½". The device E is assigned to "integer ratio value=¼". Through the above, the result illustrated in FIG. 10 is obtained. Thereafter, the storage server device 120 calculates the font size of each of the display terminals 110 through Expression (1).

Figure 10:
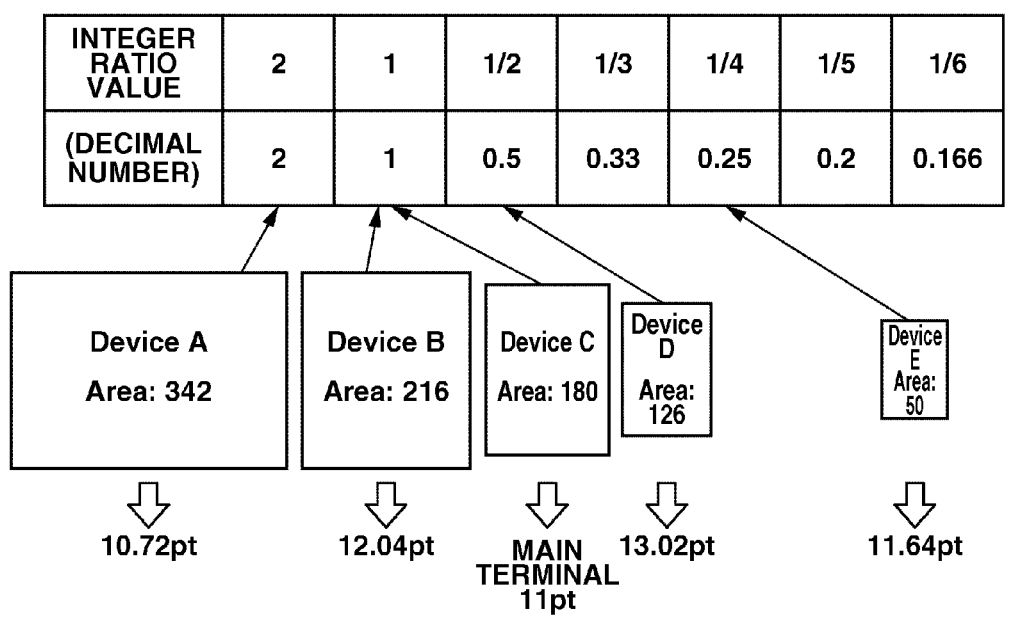
FIG. 10 is a diagram for describing an example of the style information generation processing.

For example, if the display font size of the main terminal is set to "11 pt", as illustrated in FIG. 10, the display font sizes of the respective devices A to E serving as the display terminals 110 are 10.72 pt, 12.04 pt, 11 pt, 13.02 pt, and 11.64 pt, respectively. These values are written in the "font-size" 304 under the "Body" 302 of the style information included in the EPUB document data to be distributed to each of the display terminals 110. Through this, the storage server device 120 can generate such style information that allows the pagination to match among the plurality of display terminals 110.

Although the storage server device 120 according to the first exemplary embodiment determines the main terminal based on the display screen sizes of all of the display terminals 110, the method for determining the main terminal is not limited thereto. As another example, an administrator or the like may determine the main terminal, and this setting may be preset in the storage server device 120.

A usage mode in which a mainly used display terminal 110 has been set and the other display terminals 110 are used as "guest terminals" may also be considered. In such a case, fixing the main terminal makes it possible to improve convenience for the user of the mainly used display terminal 110.

As described thus far, in the information processing system according to the first exemplary embodiment, by setting the display font size of a reflow format electronic document to a fixed value, such style information that allows the pagination to match among the plurality of display terminals 110 can be provided.

Figure 11:
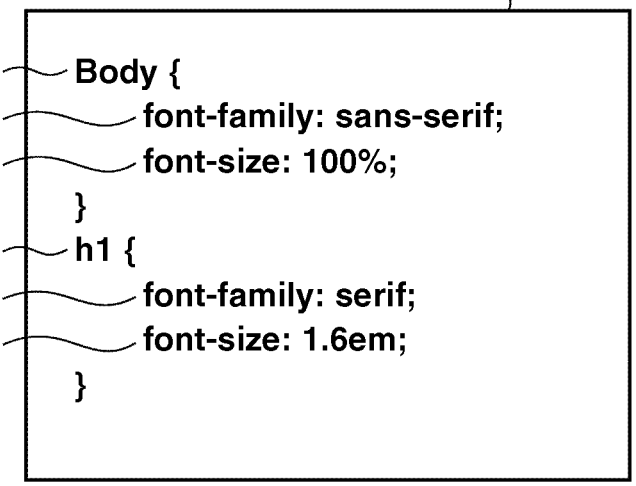
FIG. 11 illustrates an example of style information.

FIG. 11 illustrates style information in which the display font size is defined using a relative value. The style information illustrated in FIG. 11 declares "font-size: 100%". This declaration indicates that the target (body text) is displayed at a size of 100% of a default font size set in the EPUB viewer of the display terminal 110 to which the style information is distributed.

Figure 12A:
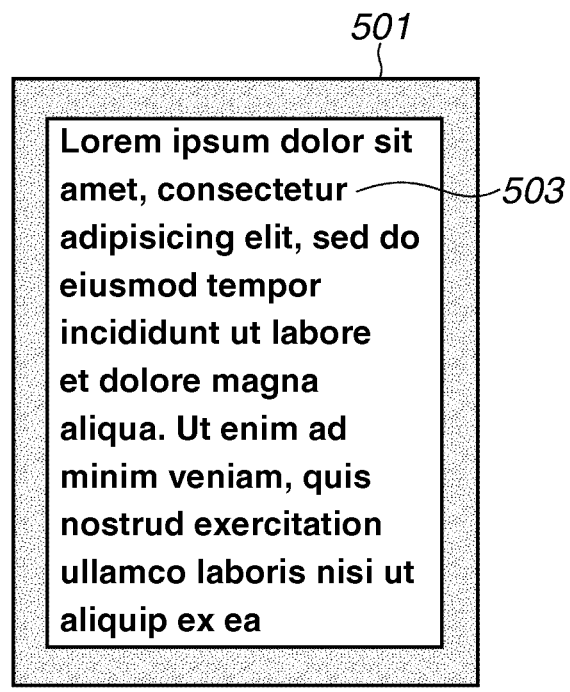
FIG. 12A illustrates a display example of an electronic document.
Figure 12B:
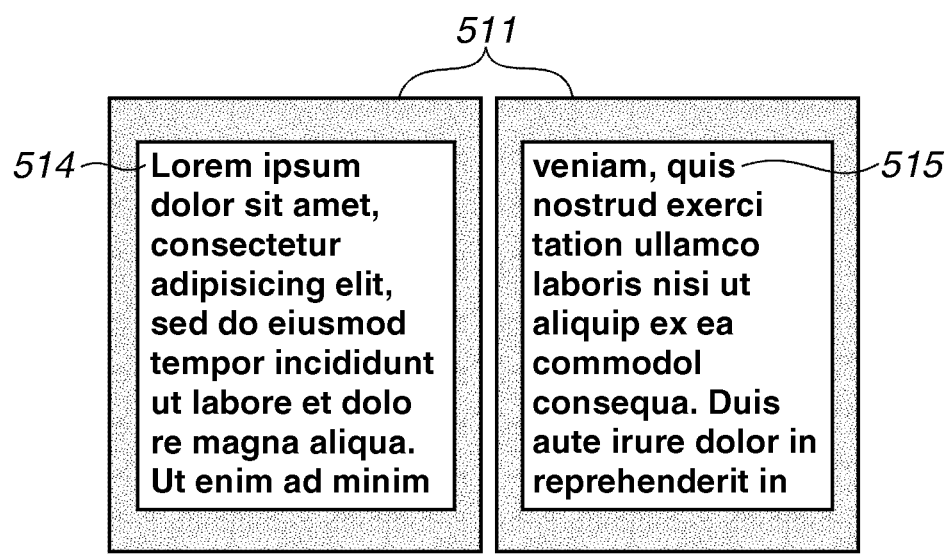
FIG. 12B illustrates another display example of the electronic document.

FIGS. 12A and 12B illustrate examples of an electronic document displayed on display screens having different display screen sizes based on the style information in which the display font size is defined using a relative value as illustrated in FIG. 11. On the display screen 501 illustrated in FIG. 12A, the "Lorem to ea" portion of the electronic document is displayed in a page 503.

Meanwhile, as illustrated in FIG. 12B, the content of the page 503 displayed on the display screen 501 is displayed across two pages 514 and 515 when the electronic document is displayed on the display screen 511, which is smaller than the display screen 501. Here, the end position of the page 515 on the display screen 511, however, does not match the end position of the page 503 on the display screen 501. In this manner, if an electronic document is paginated according to the default font size of the EPUB viewer, the pagination cannot match among the plurality of display terminals 110.

On the other hand, the storage server device 120 according to the first exemplary embodiment sets the display font size that determines the pagination in each of the display terminals 100 to a fixed value, and thus the pagination can match among the plurality of display terminals 110.

Figure 13:
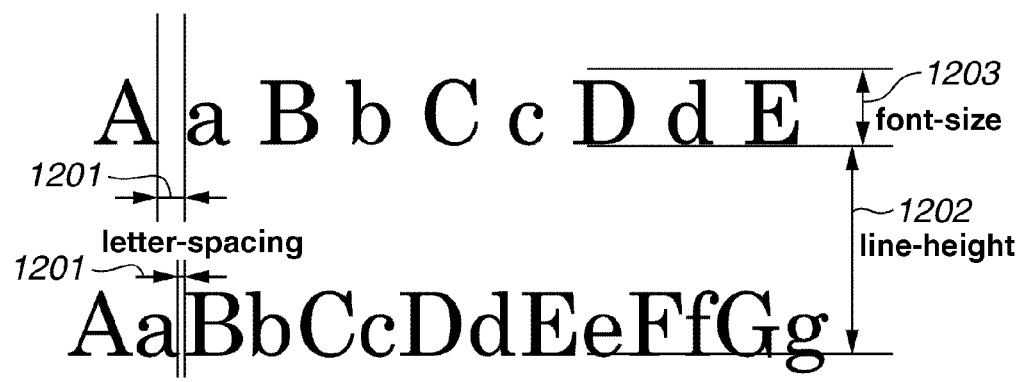
FIG. 13 illustrates a relationship among a display font size, letter spacing, and a line height.

Subsequently, an electronic document processing system according to a second exemplary embodiment of the present invention will be described. FIG. 13 is a diagram illustrating the relationship among a display font size "font-size" 1203, letter spacing "letter-spacing" 1201, and a line height "line-height" 1202 in character typesetting.

The style information can define, aside from the display font size, the letter spacing and the line height. FIGS. 14A and 14B illustrate examples of the style information. Properties "line-height" and "letter-spacing" define the line height and the letter spacing, respectively. Units "%" and "em" illustrated in FIG. 14A indicate relative values. Note that the relative values of the line height and the letter spacing change according to the display font size of the "Body". Meanwhile, "px" illustrated in FIG. 14B indicates an absolute value.

The storage server device 120 according to the second exemplary embodiment determines the display font size with a fixed value so that the pagination matches among the plurality of display terminals 110. If the line height and the letter spacing are expressed in relative values in the style information, values same as the display font size determined by the storage server device 120 are applied to the aforementioned values. If, however, the line height and the letter spacing are defined with fixed values that are different from the display font size determined by the storage server device 120 in the style information, the pagination fails to match.

Thus, the storage server device 120 according to the second exemplary embodiment defines the line height and the letter spacing in the style information not with fixed values but with relative values. To be more specific, the storage server device 120 rewrites the values of the line height and the letter spacing in the style information with relative values at a timing prior to the processing in step S623 in the electronic document processing described with reference to FIG. 7. Preferably, the storage server device 120 carries out this rewriting processing prior to carrying out the electronic document processing.

Figure 15:
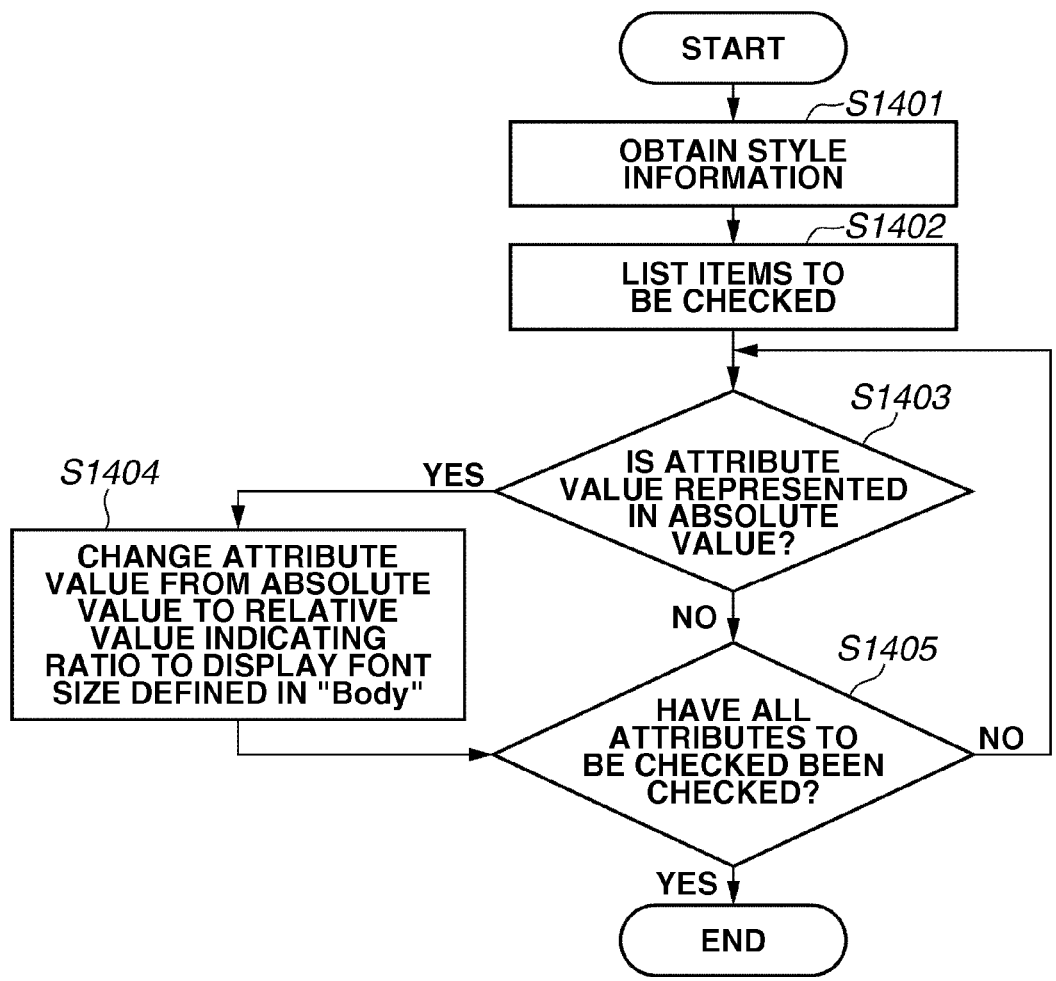
FIG. 15 is a flowchart illustrating rewriting processing.

FIG. 15 is a flowchart illustrating the rewriting processing of the storage server device 120. In the rewriting processing, in step S1401, the storage server device 120 obtains CSS style information of an EPUB, which serves as a template when transmitting document data. In step S1402, the storage server device 120 lists items that are to be checked to see whether the items are a relative value or an absolute value.

Such items to be checked include various attributes related to character typesetting such as the letter spacing and the line height.

The storage server device 120 then carries out loop processing in steps S1403 to S1405 and rewrites the values of the listed items with relative values. Specifically, in step S1403, the storage server device 120 checks whether an attribute value is written in an absolute value. If the attribute value is written in an absolute value (Yes in step S1403), in step S1404, the storage server device 120 changes the absolute value to a relative value that indicates a ratio relative to the display font size defined in the "Body". In step S1405, the storage server device 120 carries out the processing described above on all of the items.

In this manner, in the electronic document processing system according to the second exemplary embodiment, the storage server device 120 changes the attribute values except for the display font size to relative values that vary according to the display font size. Accordingly, the pagination can match among the plurality of display terminals 110 with high accuracy.

Note that the configuration and the processing of the electronic document processing system according to the second exemplary embodiment other than those described above are similar to the configuration and the processing of the electronic document processing system according to the first exemplary embodiment.

In an electronic document processing system according to a third exemplary embodiment of the present invention, the storage server device 120 distributes only style information in a state where an electronic document has been distributed to the display terminals 110. The storage server device 120 redistributes style information, for example, in a case where EPUB document data has been distributed to each of the display terminals 110 and style information thereof has been updated after the EPUB document data has been distributed.

FIG. 16 is a sequence diagram illustrating electronic document processing according to the third exemplary embodiment. The assumption here is that an EPUB viewer capable of such a unique operation that allows display of an electronic document to be updated by loading only CSS style information is installed in each of the display terminals 110. Hereinafter, processes that are different from those in the electronic document processing according to the first exemplary embodiment will be described.

In step S1502, the display terminal 110, after opening a target EPUB in an EPUB viewer, connects to the storage server device 120 and transmits the display screen size thereof. In steps S622 and S623, the storage server device 120 receives the display screen size and generates style information. In step S1525, the storage server device 120 distributes the generated style information to each of the display terminals 110.

In step S1503, the display terminal 110 receives the style information through the EPUB viewer. In step S1504, the display terminal 110 overwrites style information of the EPUB that is open in the EPUB viewer with the received style information and applies the display style.

In this manner, in the electronic document processing system according to the third exemplary embodiment, the display terminal 110 downloads only the updated style information as appropriate, instead of downloading the main body of the EPUB file as the document data each time. Thus, the download size of the display terminal 110 can be greatly reduced.

Note that the configuration and the processing of the electronic document processing system according to the third exemplary embodiment other than those described above are similar to the configuration and the processing of the electronic document processing system according to the other exemplary embodiments.

An electronic document processing system according to a fourth exemplary embodiment of the present invention adds page numbers (nombre) to an electronic document to be displayed by a plurality of display terminals 110 so that the same part in the electronic document can be identified among the plurality of display terminals 110.

Generally, pages are numbered in sequence starting from the beginning of the document as in "1, 2, 3, 4 . . . ". The electronic document processing system according to the fourth exemplary embodiment, however, applies such style that allows the content of a single page of an electronic document in one display terminal 110 to be displayed across two pages in another display terminal 110. Thus, if pages are numbered in sequence on the respective pages displayed in each of the display terminals 110 through a typical method, a different page number is added to the same area of the electronic document among the display terminals 110. Therefore, it is difficult for a plurality of users using the plurality of display terminals 110 having different display screen sizes to identify the same position in the displayed electronic document.

Thus, in the electronic document processing system according to the fourth exemplary embodiment, page numbers are added such that the users of a plurality of display terminals 110 having different display screen sizes can identify the same position in the displayed electronic document.

Figure 17A:
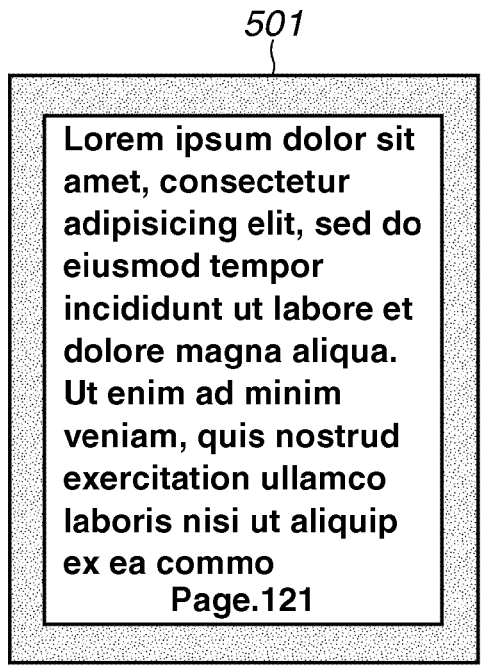
FIG. 17A illustrates an example of adding a page number.
Figure 17B:
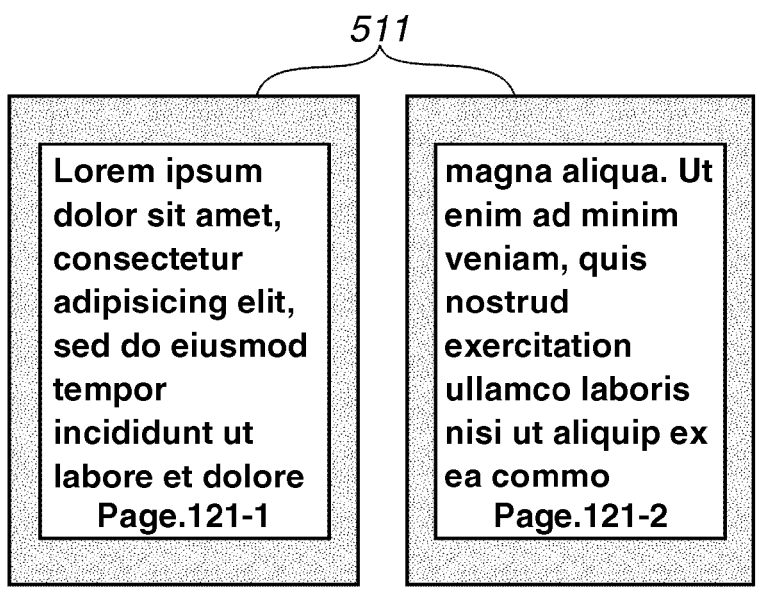
FIG. 17B illustrates another example of adding page numbers.

FIGS. 17A and 17B illustrate examples of adding page numbers. Note that the content of two pages displayed on the display screen 511 illustrated in FIG. 17B is displayed in a single page on the display screen 501 illustrated in FIG. 17A. In this case, the number "121" is added as a common page number (main page number) to each of the page illustrated in FIG. 17A and the pages illustrated in FIG. 17B. In addition, numbers ("–1", "–2") are added as subpage numbers to the pages illustrated in FIG. 17B to allow the two pages, which correspond to the page "121" illustrated in FIG. 17A, to be differentiated from each other. Through this, viewing users can identify the same position in the electronic document by the main page number. In addition, the viewing users can distinguish each page by the subpage number.

In the electronic document processing system according to the fourth exemplary embodiment, the display terminal 110 is provided with a unique EPUB viewer that can control the method for displaying the page numbers, and thus the page numbers illustrated in FIGS. 17A and 17B can be added.

FIG. 18 illustrates style information generated by the storage server device 120 according to the fourth exemplary embodiment. The style information includes "Nombre" 1801. The storage server device 120 writes a value corresponding to the integer ratio value to which the target display terminal 110 is assigned in step S712 of the style information generation processing (FIG. 9) in the "Nombre" 1801 of the style information to be distributed to the target display terminal 110. For example, if the target display terminal 110 is assigned to "integer ratio value=½", the storage server device 120 writes "2" which is an inverse number of the "integer ratio value", in "page-ratio" under the "Nombre" 1801.

Here, the integer ratio value is a value indicating a ratio of the unit of display to the reference unit, or in other words, the integer ratio value is an example of unit relationship information that indicates the relationship between the reference unit and the unit of display. The storage server device 120 then transmits the style information that contains the integer ratio value to the target display terminal 110.

Figure 19:
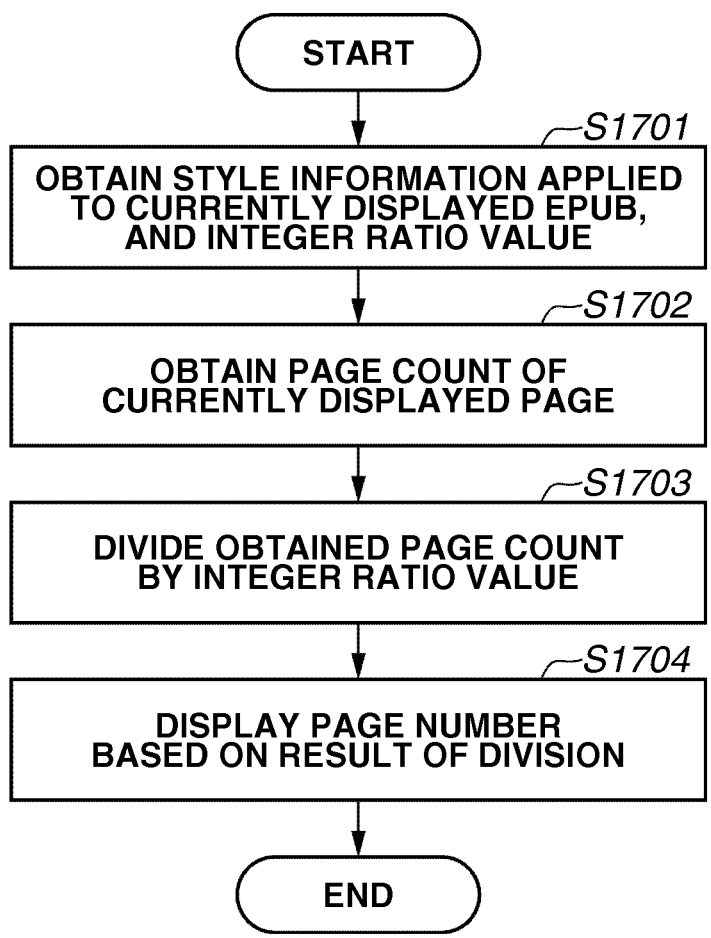
FIG. 19 illustrates page number addition processing.

FIG. 19 is a flowchart illustrating page number addition processing by the display terminal 110. The page number addition processing is carried out after the display terminal 110 receives document data in which style information is embedded. In the page number addition processing, the EPUB viewer of the display terminal 110 obtains CSS style information that is applied to the currently displayed EPUB. In step S1701, the EPUB viewer also obtains the integer ratio value defined in the "Nombre" 1801 from the style information.

The EPUB viewer then identifies the page number of the currently displayed page, counting from the first page. In other words, in step S1702, the EPUB viewer obtains the count of the currently displayed page, starting from the first page. Numbers "242" and "243" are obtained for the pages illustrated in FIG. 17B.

In step S1703, the EPUB viewer divides the obtained page count by the integer ratio value obtained in step S1701. In step S1704, the EPUB viewer sets "quotient", or the result of the division, in a main page number and "remainder+1" in a subpage number, and displays the main page number and the subpage number within a page as illustrated in FIG. 17B. Here, the main page number and the subpage number are examples of relationship information that indicates the relationship between the reference unit and the unit of display. For example, when "242" is divided by "2", the quotient is "121", and the "remainder+1" is "1". Thus, the page number "121-1" is obtained by joining the main page number and the subpage number.

As described thus far, the electronic document processing system according to the fourth exemplary embodiment can add page numbers to an electronic document to be displayed by a plurality of display terminals 110 so that the same position in the electronic document can be identified by the plurality of display terminals 110. Thus, by using the page numbers, the users can identify the same position in the electronic document.

As another example of the electronic document processing system according to the fourth exemplary embodiment, instead of using the page numbers, the position of the displayed page may be indicated by displaying percentages "%" relative to the entire electronic document. To be more specific, in this case, the EPUB viewer of the display terminal 110 is a viewer capable of displaying by percentages. In this case, the users can identify the same position in the electronic document based on the display by percentages.

Note that the configuration and the processing of the electronic document processing system according to the fourth exemplary embodiment other than those described above are similar to the configuration and the processing of the electronic document processing system according to the other exemplary embodiments.

In an electronic document processing system according to a fifth exemplary embodiment of the present invention, the pagination matches even when an electronic document is displayed on the display terminal 110 according to a zooming instruction from the user. Typically, the display font size can be changed stepwise in an EPUB viewer. This is a great advantage of a reflow format layout that allows a display format to be changed according to the user preference. In the electronic document processing system according to the fifth exemplary embodiment, the display font size settings can be changed while taking advantage of the reflow format.

In the electronic document processing system according to the fifth exemplary embodiment, JavaScript (registered trademark), which can be used in an EPUB, is used. By starting JavaScript through an operation on the EPUB viewer side, the style information is dynamically rewritten on the EPUB viewer side. Through this, while the display font size is enlarged or reduced stepwise, a state where the pagination matches among the plurality of display terminals 110 can be retained.

For example, when the display screen size of one display terminal 110 has an integer ratio value that is "½" of that of the main terminal, the content of a single page in the main terminal is displayed across two pages in this display terminal 110. To enlarge the display font size in the display terminal 110, the display terminal 110 may change the integer ratio value to a smaller value. By changing the integer ratio value, for example, from "½" to "⅓", the display terminal 110 enlarges the display font size to allow the content of a single page in the main terminal to be displayed across three pages therein. In this manner, in the electronic document processing system according to the fifth exemplary embodiment, by limiting the configurable zooming ratios, the state where the pagination matches is retained.

Figure 20:
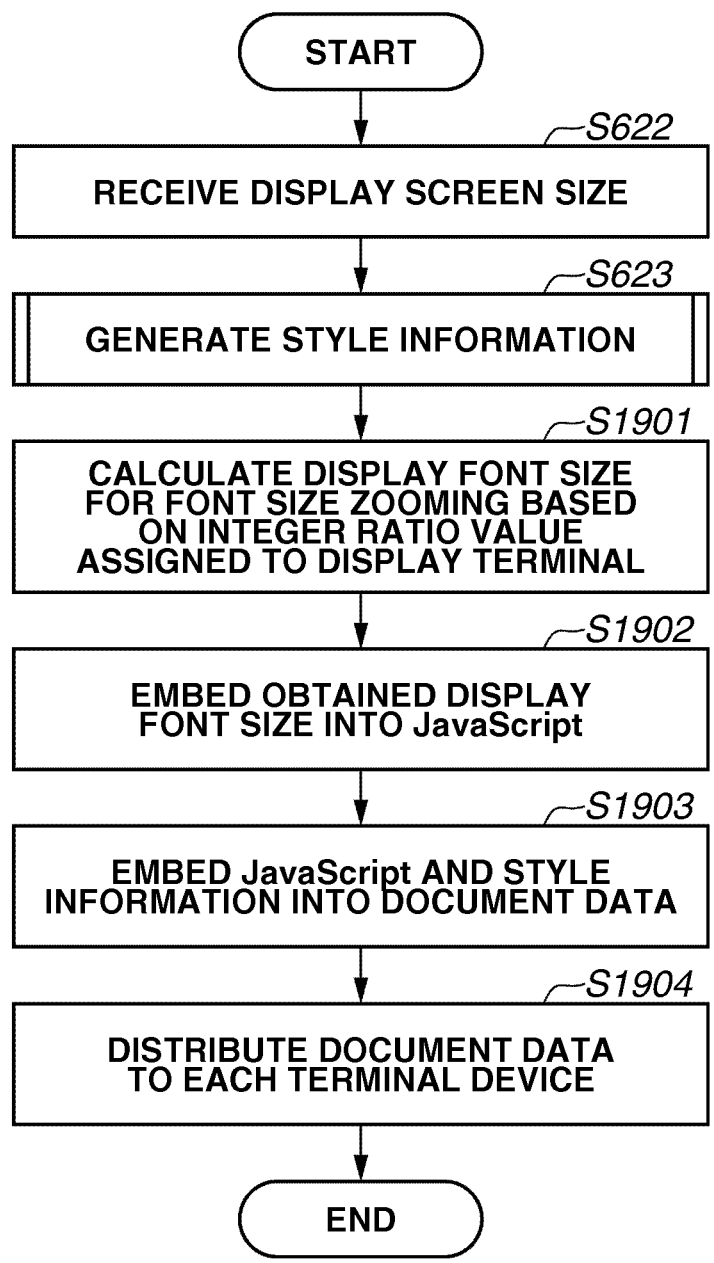
FIG. 20 illustrates font size calculation processing for zooming.

FIG. 20 is a flowchart illustrating the processing by the storage server device 120 in the electronic document processing according to the fifth exemplary embodiment. Here, processing different from the processing by the storage server device 120 in the electronic document processing illustrated in FIG. 7 will be described.

The storage server device 120 carries out processing in step S1901 after step S623. Specifically, in step S1901, the storage server device 120 calculates the display font size for font size zooming based on the integer ratio value assigned to the target display terminal 110 in the style information generation processing.

For example, if the integer ratio value of ½ is assigned to the display terminal 110, the storage server device 120 calculates a display font size that corresponds to a smaller integer ratio value (⅓, ¼) through Expression (1). Note that each integer ratio value is an example of a unit of zooming display, and the processing in step S1901 is an example of unit-of-zooming-display determination processing.

In step S1902, the storage server device 120 generates a JavaScript code and embeds a list of the obtained display font sizes in the JavaScript code. In step S1903, the storage server device 120 embeds the generated JavaScript code and the style information into EPUB document data.

In step S1904, the storage server device 120 distributes the document data that contains the JavaScript code, the style information, and the electronic document to the target display terminal 110.

Figure 21:
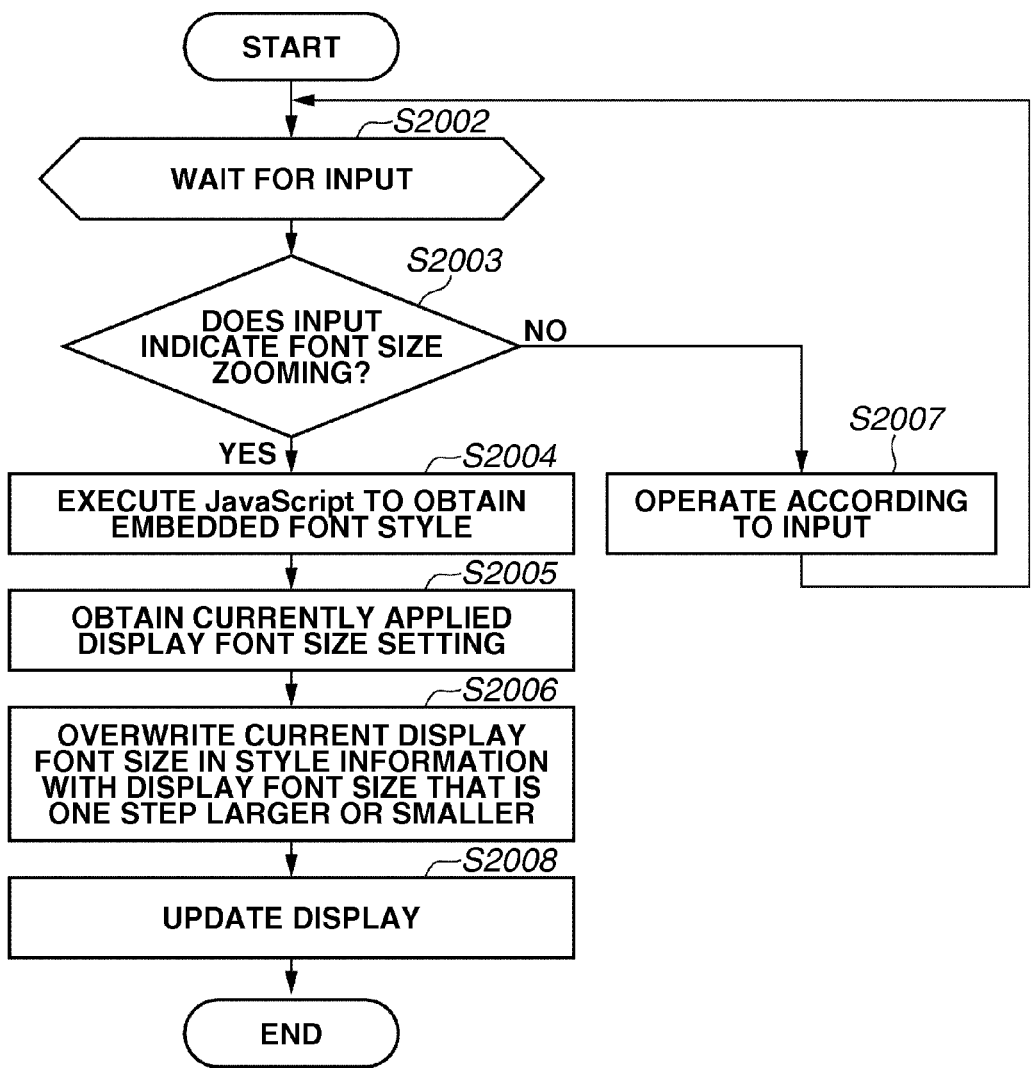
FIG. 21 is a flowchart illustrating zooming processing.

FIG. 21 is a flowchart illustrating zooming processing by the display terminal 110. When the display terminal 110 has received the EPUB document data, the EPUB viewer executes the JavaScript code embedded in the document data. Through this, the EPUB viewer changes the font size according to an operation of the user for enlarging the font size.

In the electronic document processing illustrated in FIG. 7, the display terminal 110 carries out the zooming processing after displaying the electronic document to which the style information is applied in step S604. When the zooming processing has started, in step S2002, the EPUB viewer waits for a screen operation input. Note that methods for operating the screen include a button operation, an operation for selecting a display menu, and a touch gesture through a capacitive touch panel or the like. The method for operating the screen, however, is not limited to those indicated in the exemplary embodiments.

If the EPUB viewer receives an input, in step S2003, the EPUB viewer determines whether the input indicates a zooming operation of enlarging or reducing the font size. If the input does not indicate a zooming operation (No in step S2003), in step S2007, the display terminal 110 operates according to the input indicating another operation.

Meanwhile, in step S2003, if the input indicates the zooming operation (Yes in step S2003), the EPUB viewer proceeds to processing in step S2004. Specifically, in step S2004, the EPUB viewer carries out processing according to an event of "font enlargement/reduction" written in JavaScript and obtains the list of font styles embedded in the JavaScript code.

In step S2005, the EPUB viewer obtains the display font size setting that is currently applied in the EPUB viewer. In step S2006, the EPUB viewer overwrites the display font size in the style information with a display font size that is one step larger or smaller than the obtained display font size setting value. For example, if the zooming operation indicates enlargement of the font, the EPUB viewer overwrites the display font size in the style information with a display font size that is one step larger than the set display font size.

Meanwhile, if the zooming operation indicates reduction of the font, the EPUB viewer overwrites the display font size in the style information with a display font size that is one step smaller than the set display font size. Through the processing described above, processing corresponding to the zooming operation is completed.

In this manner, in the electronic document processing system according to the fifth exemplary embodiment, as in the electronic document processing system according to the other exemplary embodiments, the pagination of the displayed electronic document can match among the plurality of display terminals 110 having different display screen sizes. In addition, in the electronic document processing system according to the fifth exemplary embodiment, the flexibility in enlarging or reducing the display font size in a reflow format electronic document can be ensured.

An advantage of reflow format electronic document display lies in that the user can freely change the font size to view the document. Thus, while taking advantage of the above, it is preferable to display an electronic document at a display font size that is close to the font size set in each of the display terminals 110 by the respective users.

An electronic document processing system according to a sixth exemplary embodiment generates style information based on a display font size that is set in each of the display terminals 110, or in other words, based on a terminal character size. Thus, the electronic document processing system according to the sixth exemplary embodiment can display an electronic document at a display font size that is close to the font size set in each of the display terminals 110.

The display terminal 110 according to the sixth exemplary embodiment is provided with a unique EPUB viewer that is capable of obtaining a set font size (terminal character size) that is set in the EPUB viewer. The display terminal 110 transmits the display screen size and the set font size to the storage server device 120 in step S602 of the electronic document processing (FIG. 7) according to the first exemplary embodiment. The storage server device 120 in turn receives the display screen size and the set font size from the display terminal 110 in step S622.

Figure 22:
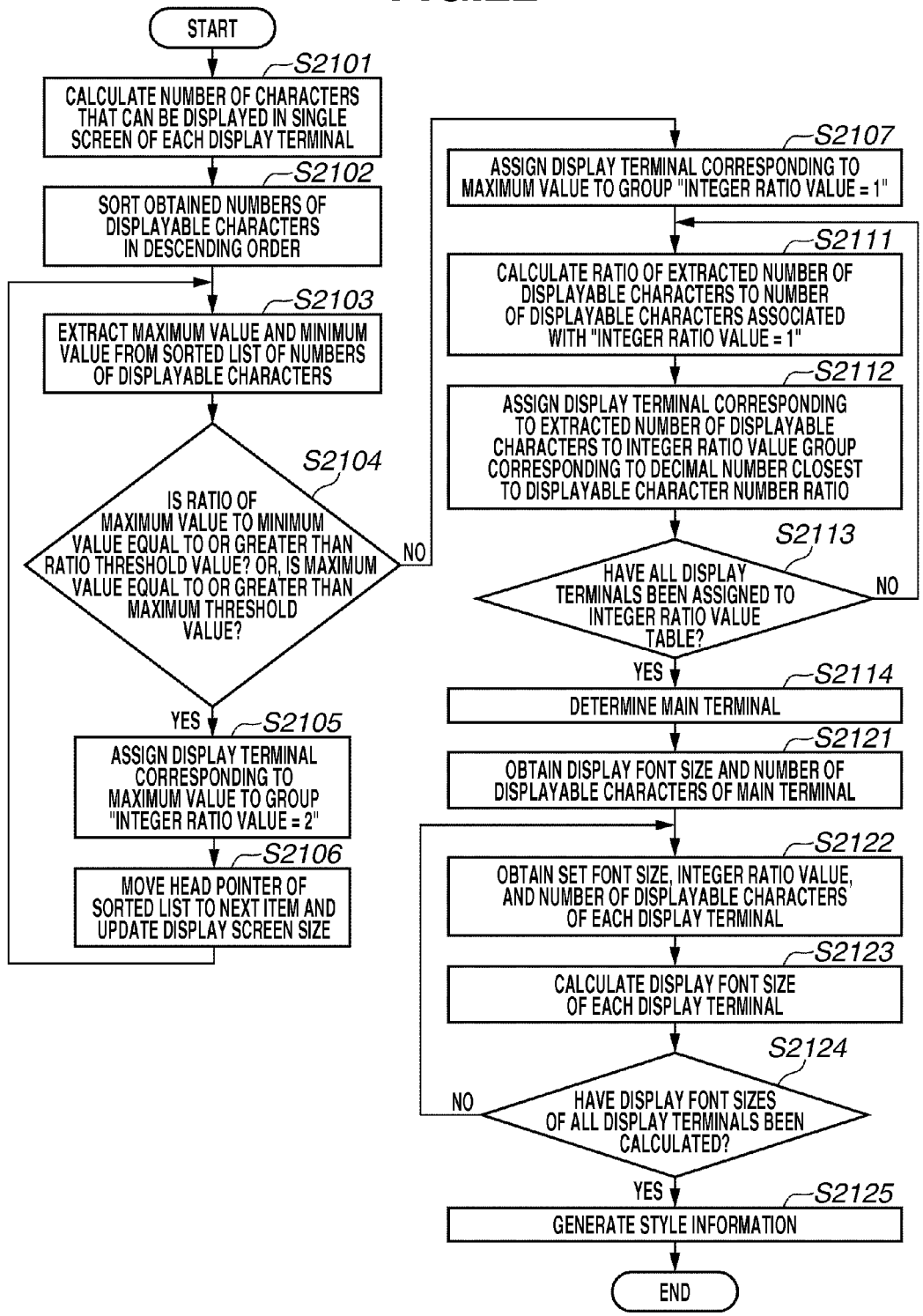
FIG. 22 illustrates style information generation processing according to a sixth exemplary embodiment of the present invention.

FIG. 22 is a flowchart illustrating the style information generation processing by the storage server device 120 according to the sixth exemplary embodiment. In step S2101, the storage server device 120 calculates the number of characters that can be displayed on a single screen based on the display screen size and the set font size of each of the display terminals 110 obtained in step S622 through Expression (2).

$$CharNum = \frac{Area}{CurrentFontSize^2} \quad 2)$$

*CharNum*: number of displayable characters on screen

Area: screen size (area) of terminal

*CurrentFontSize*: current font size setting

Here, CharNum represents the number of displayable characters on a screen. Area represents the display screen size (area). CurrentFontSize represents the set font size.

For example, if the display screen size is 180 cm² (18000 mm²) and the set font size is 12 point, which corresponds to approximately 4.2 mm, the number of characters that can be displayed in a single screen turns out to be 1004.4 through Expression (2).

In step S2102, the storage server device 120 sorts, in descending order, the numbers of displayable characters obtained for the respective display terminals 110. In step S2103, the storage server device 120 obtains the top and bottom items on the sorted list to thus extract the maximum and minimum numbers of displayable characters.

In step S2104, the storage server device 120 obtains a ratio of the maximum value to the minimum value and compares the obtained ratio with a ratio threshold value. In addition, the storage server device 120 compares the maximum value with a maximum threshold value. Note that the ratio threshold value and the maximum threshold value are preset in the storage server device 120.

In step S2104, if the ratio is equal to or greater than the ratio threshold value or if the maximum value is equal to or greater than the maximum threshold value (Yes in step S2104), the storage server device 120 proceeds to processing in step S2105. Specifically, in step S2105, the storage server device 120 assigns a display terminal 110 that corresponds to the maximum value to the group of "integer ratio value=2" in the integer ratio value table. In step S2106, the storage server device 120 moves the head pointer of the sorted list to the next item on the sorted list and updates the display screen size that corresponds to the top item on the sorted list. The storage server device 120 then repeats the processes in steps S2103 and S2104.

In step S2104, if the ratio is less than the ratio threshold value and if the maximum value is less than the maximum threshold value (No in step S2104), the storage server device 120 proceeds to processing in step S2107. In step S2107, the storage server device 120 assigns a display terminal 110 that corresponds to the maximum value to the group of "integer ratio value=1" in the integer ratio value table.

Thereafter, the storage server device 120 calculates a ratio of the number of displayable characters for each of the numbers of displayable characters on the sorted list through loop processing in steps S2111 to S2113. Here, the ratio of the number of displayable characters refers to a ratio of the number of displayable characters in a target display terminal 110 to the number of displayable characters in the display terminal 110 associated with the group of "integer ratio value=1" in step S2107.

To be more specific, in step S2111, the storage server device 120 extracts one of the numbers of displayable characters from the sorted list. The storage server device 120 then calculates the ratio of the extracted number of displayable characters to the number of displayable characters in the display terminal 110 associated with "integer ratio value=1", or in other words, calculates the ratio of the number of displayable characters.

For example, if the number of displayable characters in the display terminal 110 assigned to the group "integer ratio value=1" in step S2107 is 1000, and if the extracted number of displayable characters is 580, the ratio of the number of displayable characters turns out to be "580/1000=0.58".

The storage server device 120 then compares the ratio of the number of displayable characters calculated in step S2111 with decimal numbers in the integer ratio value table (FIG. 8). In step S2112, the storage server device 120 assigns the display terminal 110 that corresponds to the extracted number of displayable characters to an integer ratio value group that corresponds to a decimal number that is closest to the obtained ratio of the number of displayable characters.

For example, the value "0.58" is closest to "0.5" among the decimal numbers in the integer ratio value table. Therefore, the display terminal 110 for which the value of "0.58" has been obtained is associated with a group of "integer ratio value=0.5". Through the processing described above, the storage server device 120 assigns each of the display terminals 110 to a corresponding one of the integer ratio values and stores the obtained information.

The storage server device 120 repeats the processes in steps S2111 and S2112, and in step S2113, the storage server device 120 assigns each of the display terminals 110 to a correspond one of the integer ratio values in the integer ratio value table. Subsequently, the storage server device 120 identifies, among the display terminals 110 assigned to "integer ratio value=1", a display terminal 110 having the largest number of displayable characters. In step S2114, the storage server device 120 determines the identified display terminal 110 that corresponds to the largest number of displayable characters as the "main terminal".

In step S2121, the storage server device 120 obtains the display font size and the number of displayable characters of the main terminal. Thereafter, the storage server device 120 calculates the display font size of each of the display terminals 110 through loop processing in steps S2122 to S2124. Specifically, in step S2122, the storage server device 120 refers to the set font size, the integer ratio value, and the number of displayable characters in each of the display terminals 110. In step S2123, the storage server device 120 determines font sizes for achieving the integer ratio values assigned to the respective display terminals 110 except for the main terminal through Expression (3).

$$FontT = FontS \times \sqrt{\frac{CharNumT}{CharNumS \times \text{Ratio}}}$$

*FontS*: reference font size of main terminal

*FontT*: font size of calculation target terminal

*CharNumS*: number of characters in standard terminal

-continued

*CharNumT*: number of characters in target terminal

Ratio: previously obtained integer ratio value

Here, FontS represents the display font size of the main terminal. FontT represents the display font size of a display terminal 110 of which the display font size is to be calculated. CharNumS represents the number of displayable characters in the main terminal. CharNumT represents the number of displayable characters in the display terminal 110 of which the display font size is to be calculated. Ratio represents the integer ratio value to which the display terminal 110 of which the display font size is to be calculated is assigned.

In this manner, the storage server device 120 determines the display font size of the target display terminal 110 with respect to the display font size of the main terminal, based on the ratio of the number of displayable characters in the target display terminal 110 to the number of displayable characters in the main terminal and on the integer ratio value through Expression (3).

The storage server device 120 repeats the processes in steps S2122 and S2123, and in step S2124, the storage server device 120 calculates the display font sizes of all of the display terminals 110. In step S2125, the storage server device 120 generates style information that indicates the display font sizes obtained for the respective display terminals 110. Thus, the style information generation processing is completed.

Figure 23A:
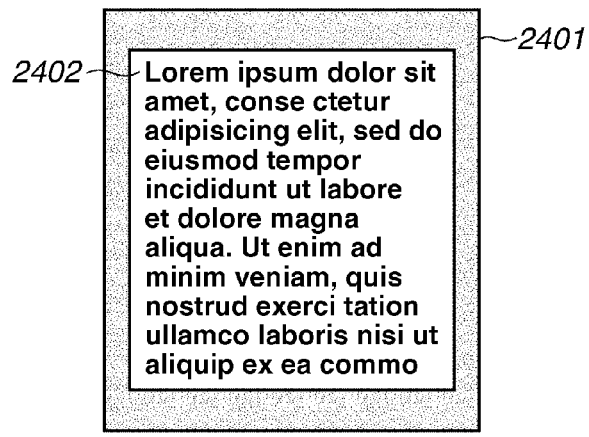
FIG. 23A illustrates an example of the result of the style information generation processing.
Figure 23B:
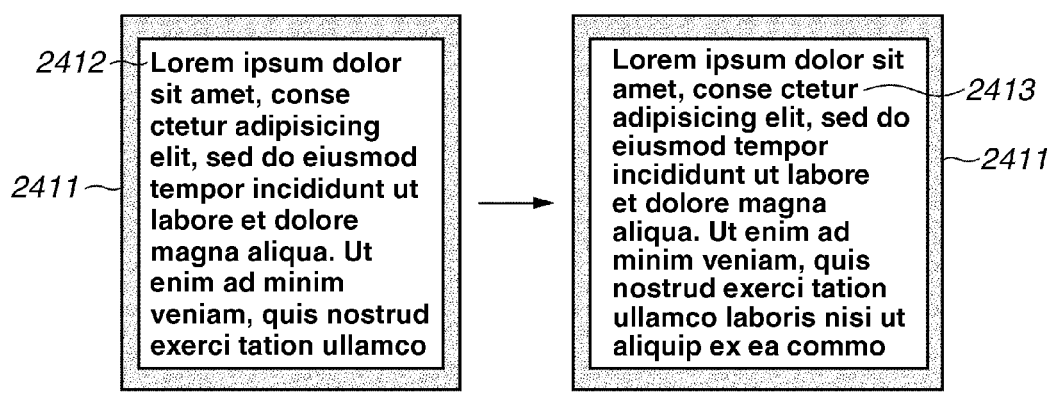
FIG. 23B illustrates another example of the result of the style information generation processing.
Figure 23C:
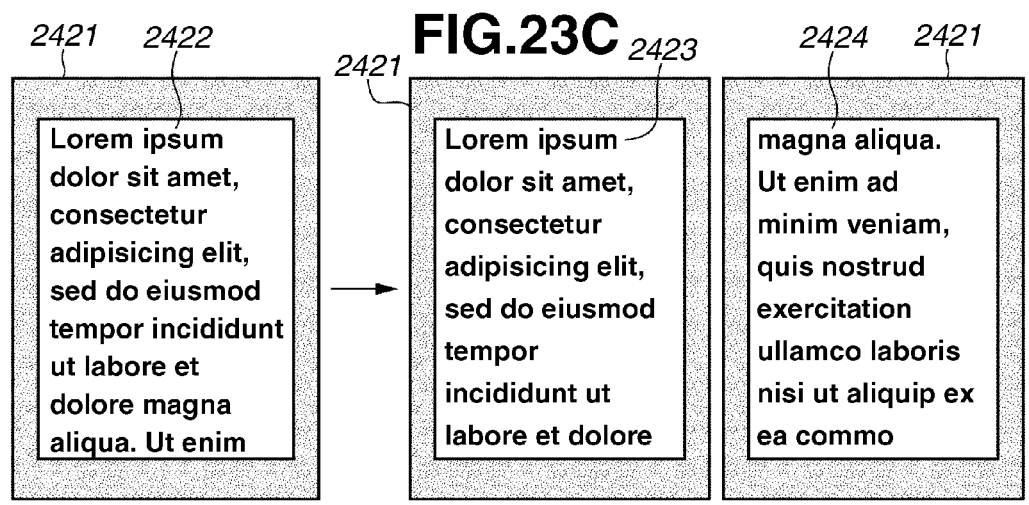
FIG. 23C illustrates yet another example of the result of the style information generation processing.

FIGS. 23A to 23C illustrate examples of the result of the style information generation processing according to the sixth exemplary embodiment. FIGS. 23A to 23C illustrate display screens of different display terminals 110. Here, the display screen size of a display screen 2411 illustrated in FIG. 23B is smaller than the display screen size of a display screen 2401 illustrated in FIG. 23A. In addition, the display screen size of a display screen 2421 illustrated in FIG. 23C is approximately the same as the display screen size of the display screen 2401 illustrated in FIG. 23A. Here, the display terminal 110 having the display screen 2401 is set as the main terminal.

On the display screen 2401 illustrated in FIG. 23A, the "Lorem to commo" portion of the electronic document is displayed in a single page 2402 by using the number of displayable characters that has been calculated from the set font size and the display screen size as a unit of division.

In addition, on the display screens 2411 and 2421 illustrated at the left side of FIGS. 23B and 23C, respectively, pages 2412 and 2422, which have been paginated according to the set font size of the respective display screens 2411 and 2421, are displayed, respectively. On the display screen 2411 illustrated at the right side of FIG. 23B, a pages 2413, which has been paginated based on the style information generated in the style information generation processing illustrated in FIG. 22, is displayed. Meanwhile, on the display screen 2421 illustrated at the right side of FIG. 23C, pages 2423 and 2424, which have been paginated based on the style information generated in the style information generation processing illustrated in FIG. 22, are displayed.

The pagination in each of the pages 2412 and 2422 illustrated at the left side of FIGS. 23B and 23C, respectively does not match the pagination in the page 2402 of the main terminal illustrated in FIG. 23A. Meanwhile, the pagination in each of the pages 2413 and the pages 2423 and 2424 illustrated at the right side of FIGS. 23B and 23C, respectively matches the pagination in the page 2402 of the main terminal. In this manner, the storage server device 120 according to the sixth exemplary embodiment can generate such style information that allows the pagination to match among the plurality of display terminals 110 having different display screen sizes.

In addition, the display screen size of the display screen 2411 illustrated in FIG. 23B is smaller than the display screen size of the display screen 2401 of the main terminal. However, the set font size of the display screen 2411 is smaller. Thus, while the display screen 2411 has a smaller display screen size, the display screen 2411 displays, within a single page, characters in the number that is the same as the number of displayable characters in the main terminal.

In addition, the display screen size of the display screen 2421 illustrated in FIG. 23C is approximately the same size as the display screen size of the main terminal. However, the set font size of the display screen 2421 is larger. Thus, the pagination is such that the content of two pages on the display screen 2421 fits in a single page in the main terminal.

In this manner, the electronic document processing system according to the sixth exemplary embodiment can display an electronic document at a display font size that is as close as possible to the set font size of each of the display terminals 110. Further, in the electronic document processing system according to the sixth exemplary embodiment, the pagination can match among the plurality of display terminals 110 having different display screen sizes.

Furthermore, as described above, in the electronic document processing system according to the sixth exemplary embodiment, the storage server device 102 receives the set font size along with the display screen size in the electronic document processing (FIG. 7). Thus, in this case, the storage server device 120 may generate such style information in which "font-size" is specified by percentages, as illustrated in FIG. 11. In such a case, the storage server device 120 may calculate the percentages based on the display font size obtained in the style information generation processing and the set font size.

Note that the configuration and the processing of the electronic document processing system according to the sixth exemplary embodiment other than those described above are similar to the configuration and the processing of the electronic document processing system according to the other exemplary embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present invention, a system for improving convenience of viewing users when sharing an electronic document among a plurality of terminals can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-013573 filed Jan. 28, 2013, which is hereby incorporated by reference herein in its entirety.

What is claimed is:

1. An information processing apparatus, comprising:
   a memory; and
   a processor in communication with the memory, the processor configured to:
   obtain information regarding sizes of display screens of a plurality of display terminals that displays reflow format document data, the document data including a font with a set font size;
   determine a main terminal from among the plurality of display terminals based on the sizes of the display screens of the plurality of display terminals;
   determine a reference unit, which is used for dividing the document data into a plurality of pages, based on the size of the display screen of the main terminal and a reference character size of the main terminal;
   determine a unit of display, which is used for dividing the document data into a plurality of pages, for each of the plurality of display terminals, wherein the unit-of-display is determined based on an integral multiple of the determined reference unit for a display terminal which has a size of display screens larger than the size of the display screen of the main terminal, and wherein the unit-of-display is determined based on an integral submultiple of the determined reference unit for a display terminal which has a size of display screens smaller than the size of the display screen of the main terminal;
   generate style information for each of the plurality of display terminals based on the unit of display determined for each of the plurality of display terminals; and
   transmit the document data and the style information generated for each of the display terminals to each of the display terminals.

2. An information processing method, comprising:
   obtaining information regarding sizes of display screens of a plurality of display terminals that displays reflow format document data, the document data including a font with a set font size;
   determining a main terminal from among the plurality of display terminals based on the sizes of the display screens of the plurality of display terminals;
   determining a reference unit, which is used for dividing the document data into a plurality of pages, based on the size of the display screen of the main terminal and a reference character size of the main terminal;
   determining a unit of display, which is used for dividing the document data into a plurality of pages, for each of the plurality of display terminals, wherein an integral multiple of the determined reference unit is determined as a unit of display for a display terminal which has a size of display screens larger than the size of the display screen of the main terminal, and wherein an integral submultiple of the determined reference unit is determined as a unit of display for a display terminal which has a size of display screens smaller than the size of the display screen of the main terminal;

generating style information for each of the plurality of display terminals based on the unit of display determined for each of the plurality of display terminals; and transmitting the document data and the style information generated for each of the display terminals to each of the display terminals.

3. A non-transitory computer-readable storage medium storing instructions which, when executed by an information processing apparatus, causes the information processing apparatus to execute operations comprising:

obtaining information regarding sizes of display screens of a plurality of display terminals that displays reflow format document data, the document data including a font with a set font size;

determining a main terminal from among the plurality of display terminals based on the sizes of the display screens of the plurality of display terminals;

determining a reference unit, which is used for dividing the document data into a plurality of pages, based on the size of the display screen of the main terminal and a reference character size of the main terminal;

determining a unit of display, which is used for dividing the document data into a plurality of pages, for each of the plurality of display terminals, wherein an integral multiple of the determined reference unit is determined as a unit of display for a display terminal which has a size of display screens larger than the size of the display screen of the main terminal, and wherein an integral submultiple of the determined reference unit is determined as a unit of display for a display terminal which has a size of display screens smaller than the size of the display screen of the main terminal;

generating style information for each of the plurality of display terminals based on the unit of display determined for each of the plurality of display terminals; and transmitting the document data and the style information generated for each of the display terminals to each of the display terminals.

\* \* \* \* \*